(12) United States Patent
Dougherty et al.

(10) Patent No.: US 8,774,569 B2
(45) Date of Patent: Jul. 8, 2014

(54) HIGH CONFINEMENT WAVEGUIDE ON AN ELECTRO-OPTIC SUBSTRATE

(75) Inventors: David J. Dougherty, Pleasanton, CA (US); Karl Kissa, West Simsbury, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 13/467,877

(22) Filed: May 9, 2012

(65) Prior Publication Data

US 2012/0230630 A1 Sep. 13, 2012

Related U.S. Application Data

(62) Division of application No. 12/215,856, filed on Jun. 30, 2008, now abandoned.

(51) Int. Cl.
*G02B 6/12* (2006.01)
*G02B 6/42* (2006.01)

(52) U.S. Cl.
USPC .................................. 385/14; 385/8; 385/43

(58) Field of Classification Search
CPC ........................................................ G02B 6/42
USPC ............................................ 385/30, 8, 14, 28
See application file for complete search history.

(56) References Cited

U.S. PATENT DOCUMENTS

| | | | | |
|---|---|---|---|---|
| 4,737,015 A | 4/1988 | Ishida et al. | | 385/142 |
| 4,865,407 A * | 9/1989 | Suzuki et al. | | 385/31 |
| 5,371,817 A * | 12/1994 | Revelli et al. | | 385/44 |
| 6,411,752 B1 | 6/2002 | Little et al. | | 385/17 |
| 6,470,130 B1 | 10/2002 | Walker et al. | | 385/142 |
| 6,522,794 B1 * | 2/2003 | Bischel et al. | | 385/4 |
| 6,670,210 B2 | 12/2003 | Johannessen | | 438/31 |
| 6,785,447 B2 | 8/2004 | Yoshimura et al. | | 385/42 |
| 6,864,512 B2 | 3/2005 | Johannessen | | 257/84 |
| 6,870,987 B2 * | 3/2005 | Lee | | 385/28 |
| 6,928,209 B2 | 8/2005 | Su et al. | | 385/24 |
| 6,934,427 B2 * | 8/2005 | Lee et al. | | 385/14 |
| 7,058,258 B2 | 6/2006 | Yamazaki | | 385/27 |
| 7,103,245 B2 * | 9/2006 | Lee et al. | | 385/28 |
| 7,509,006 B2 * | 3/2009 | Shiraishi | | 385/40 |
| 7,809,229 B2 * | 10/2010 | Shiraishi | | 385/129 |
| 2003/0012493 A1 * | 1/2003 | Lee et al. | | 385/28 |

(Continued)

OTHER PUBLICATIONS

Y. Shani, et. al., "Integrated optic adiabatic devices on silicon," IEEE Journal of Quantum Electronics, vol. 27, No. 3, Mar. 1991, pp. 556-566.

(Continued)

*Primary Examiner* — Kaveh Kianni
(74) *Attorney, Agent, or Firm* — Matthew A. Pequignot; Pequignot + Myers LLC

(57) ABSTRACT

The invention relates to an optical device including a passive high confinement waveguide, such as of silicon-rich silicon nitride, on an electro-optic substrate, like lithium niobate, optically coupled to a waveguide in the electro-optic substrate. A wide range of electro-optic devices are enabled by this high confinement waveguide structure, including: directional couplers, compact tap couplers, folded electro-optic devices, electro-optic modulators including ring resonators, electro-optic gratings. Further applications enabled by the present invention include hybrid passive planar lightwave circuits (PLC) integrated with electro-optically active waveguides, using the high confinement waveguide as an intermediary waveguide to transfer optical power between the passive and active components.

5 Claims, 29 Drawing Sheets

(56) References Cited

U.S. PATENT DOCUMENTS

| | | | |
|---|---|---|---|
| 2004/0037497 A1* | 2/2004 | Lee | 385/28 |
| 2007/0036500 A1* | 2/2007 | Suzuki et al. | 385/129 |
| 2009/0231686 A1* | 9/2009 | Atkins et al. | 359/341.3 |
| 2012/0301075 A1* | 11/2012 | Wang et al. | 385/28 |

OTHER PUBLICATIONS

N. Daldosso, et. al., "Comparison among various $Si_3N_4$ waveguide geometries grown within a CMOS fabrication pilot line," IEEE Journal of Lightwave Technology, vol. 22, No. 7, Jul. 2004, pp. 1734-1740.

H.H. Yaffe, et. al., "Polarization-independent silica-on-silicon Mach-Zehnder interferometers," IEEE Journal of Lightwave Technology, vol. 12, No. 1, Jan. 1994, pp. 64-67.

T. Barwicz, et. al., "Fabrication of add-drop filters based on frequency-matched microring resonators," IEEE Journal of Lightwave Technology, vol. 24, No. 5, May 2006, pp. 2207-2218.

W.C.L. Hopman, et. al., "Quasi-one-dimensional photonic crystal as a compact building-block for refractometric optical sensors", IEEE Journal of Selected Topics in Quantum Electronics, vol. 11, No. 1, Jan./Feb. 2005, pp. 11-16.

I. Faderl, et. al., "Integration of an electrooptic polymer in an integrated optic circuit on silicon," IEEE Journal of Lightwave Technology, vol. 13, No. 10, Oct. 1995, pp. 2020-2026.

B. Jalali, et. al., "Silicon photonics," IEEE Microwave Magazine, Jun. 2006, pp. 58-68.

K. Suzuki, et. al., "High-speed optical 1 4 switch based on generalized Mach-Zehnder interferometer with hybrid configuration of silica-based PLC and lithium niobate phase-shifter array," IEEE Photonics Technology Letters, vol. 19, No. 9, May 1, 2007, pp. 674-676.

Y. Yamada, et. al., "An application of silica-on-terraced-silicon platform to hybrid Mach-Zehnder interferometric circuits consisting of silica-waveguides and $LiNbO_3$ phase shifters," IEEE Photonics Technology Letters, vol. 6, No. 7, Jul. 1994, pp. 822-824.

A. Fang, et. al., "Hybrid silicon evanescent device platform," IEEE LEOS Newsletter, Apr. 2007, pp. 4-11.

Lin Zhang et al., "Silicon microring-resonator-based modulation and demodulation of DQPSK signals", OFC/NFOEC, 2008.

* cited by examiner

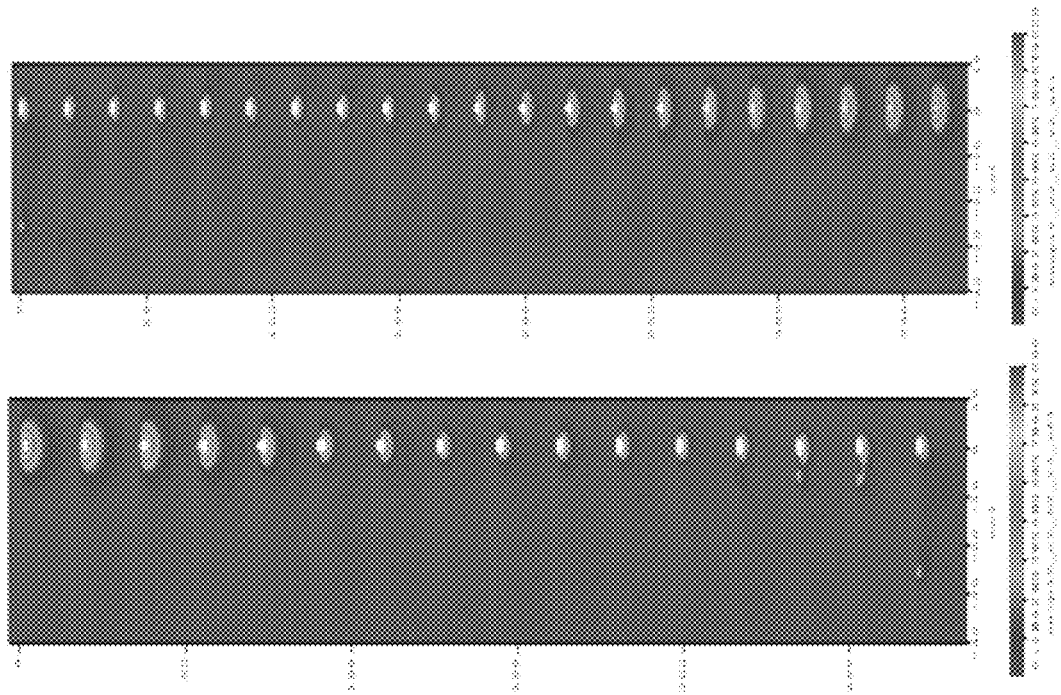

HIGH CONFINEMENT WAVEGUIDE ON AN ELECTRO-OPTIC SUBSTRATE

CROSS-REFERENCE TO RELATED APPLICATIONS

The present application is a divisional application of U.S. patent application Ser. No. 12/215,856, filed on Jun. 30, 2008, entitled HIGH CONFINEMENT WAVEGUIDE ON AN ELECTRO-OPTIC SUBSTRATE, the entirety of which is hereby incorporated by reference.

TECHNICAL FIELD

The present invention relates to an optical device including a passive high confinement waveguide, such as of silicon-rich silicon nitride, on an electro-optic substrate, like lithium niobate, optically coupled to a waveguide in the electro-optic substrate. A wide range of electro-optic devices are enabled by this high confinement waveguide structure, including: directional couplers, compact tap couplers, folded electro-optic devices, electro-optic modulators including ring resonators, electro-optic gratings. Further applications enabled by the present invention include hybrid passive planar lightwave circuits (PLC) integrated with electro-optically active waveguides, using the high confinement waveguide as an intermediary waveguide to transfer optical power between the passive and active components.

BACKGROUND OF THE INVENTION

A high confinement waveguide for use on electro-optic substrates is highly desirable for its ability to decrease the bend radius of optical waveguides. This would facilitate size reduction of devices, more functionality and greater packing density on electro-optic chips. A further benefit is the creation of hybrid PLC-electro-optic chips.

Due to the small index delta between diffused waveguides, and surrounding electro-optic substrate, such as Ti in lithium niobate, the bend radius for waveguides with acceptable loss is currently rather large. This is a major limiting factor to reducing electro-optic device size. A higher confinement monolithically or hybrid integrated waveguide with a greater index of refraction would enable a smaller bend radius and smaller device features. However, if the higher index material used to make the higher confinement waveguide is electro-optically inactive, the optical power must be transferred adiabatically between the high confinement waveguide and lower confinement electro-optically active waveguide. A structure is needed which can tighten the mode field of the optical signal for passive features, like bends, while still permitting as much transmission within the electro-optic substrate as possible in other portions of the device. Monolithic or hybrid vertical integration of low and high confinement waveguides is also desired as it will lower the total cost of the device by eliminating the need for butt-joint optical transitions between substrates made of different materials, which require precision alignment.

Planar lightwave circuits (PLC) are a well developed passive optical technology. Most common is a silica-on-silicon structure in which waveguides having a core of doped silicon dioxide ($SiO_2$) are deposited on an undoped silicon dioxide cladding layer, lithographically etched, and are subsequently coated with an undoped silicon dioxide upper cladding layer. The doped silica core has a slightly higher optical index of refraction than the cladding. Waveguides have also been made in silicon nitride SiN on a silicon substrate. The core of the silicon nitride waveguide must be much thinner and narrower than the silica waveguide in order to allow only one guided mode to exist, because the SiN index of refraction is likely to be much higher than the doped $SiO_2$, making the index change, $\Delta n$, much higher.

A hybrid passive optical waveguide is described in an article by Y. Shani et al, "Integrated optic adiabatic devices on silicon" in IEEE Journal of Quantum Electronics, Vol. 27, No. 3, March 1991, pp 556-566. In that hybrid waveguide 1, as shown in FIG. 1, a stoichiometric SiN strip ($Si_3N_4$) is fabricated as an inner core 2 within the doped $SiO_2$ core 4. Most of the light is guided within the $Si_3N_4$ strip 2 in this hybrid waveguide 1. FIG. 2 shows an adiabatic taper 3 in the lateral width of $Si_3N_4$ 2, described by Shani above, that allows the optical power carried in the $Si_3N_4$ strip 2 to be transferred into the larger mode doped $SiO_2$ core 4, or vice-versa, without change of mode or loss of optical power. FIG. 3 shows overlapping tapers 5, 7 between conventional silica 8 and SiN 6 waveguides also described by Shani et al. that allow adiabatic transfer of power. The cross section of the overlap region is similar to FIG. 1 for the portion where the doped $SiO_2$ core 4 is wider than the SiN strip 2.

Prior art U.S. Pat. No. 4,737,015 describes an "oxi-nitride" layer on top of lithium niobate that is used to create a stress-induced waveguide. The "oxi-nitride" layer is a blend of $SiO_2$ and SiN. U.S. Pat. Nos. 6,670,210 and 6,864,512 also describe a waveguide containing $SiO_2$ and SiN. It is important to note that the refractive index of the "oxi-nitride" referenced in these patents is not high enough to function as a waveguide core, with lithium niobate as an undercladding substrate. In fact, stoichiometric SiN ($Si_3N_4$) has an optical index which is too low to create a waveguide core directly over a lithium niobate substrate. In the prior art SiN is used to form both the core and the cladding by varying the amount of nitrogen to obtain the refractive index difference. Alternatively, $SiO_2$ is used as a cladding layer. However, this provides too much confinement for an electro-optic device.

What is needed for a high confinement waveguide on an electro-optic substrate, is a material having a higher refractive index than the electro-optic substrate that can reduce the mode size of the optical signal. To transfer the optical signal to and from the diffused waveguide, the refractive index of the high confinement waveguide must be at least equal to or higher than the refractive index of the diffused waveguide. The diffused waveguide has an inhomogeneous refractive index with a maximum index at the top center. By contrast the high confinement waveguide has a homogeneous refractive index and this should be higher than an average index of the diffused waveguide. Furthermore, the optical absorption and optical scattering losses must be low. To be practical, the propagation loss in the SiN:Si on lithium niobate should be less than 1 dB/cm.

In order to get a high enough index to create a waveguide core confined by lithium niobate, the SiN must be silicon-rich. Silicon-rich silicon nitride waveguides are described, for example in U.S. Pat. No. 6,470,130, as silicon nitrides having a ratio of greater than 3 silicon atoms to 4 nitrogen atoms per molecule. Silicon nitride compounds having the formula $Si_3N_4$ are considered stoichiometric. Silicon nitride compounds with higher silicon content are considered silicon-rich silicon nitrides, written as SiN:Si. The silicon content of silicon nitride is controlled by changing the gas flow parameters and temperature during deposition. As the gas parameters are changed, the index of refraction is affected as well.

Stoichiometric SiN ($Si_3N_4$) waveguides are described in Shani, discussed above, and in an article by N. Daldosso, et al., "Comparison among various $Si_3N_4$ waveguide geometries grown within a CMOS fabrication pilot line," IEEE Journal of Lightwave Technology, Vol 22, No 7, July 2004, pp. 1734-1740. Patches of SiN under a silica (SiO$_2$) core have been used to compensate for birefringence, as described by H. H. Yaffe, et al., "Polarization-independent silica-on-silica Mach-Zehnder interferometers," IEEE journal of Lightwave Technology, Vol 12, No 1, January 1994, pp. 64-67. SiN waveguides have been fabricated which have air as a top cladding and SiO$_2$ as a bottom cladding, described by T. Barwicz, et al., "Fabrication of add-drop filters based on frequency-matched microring resonators," IEEE Journal of Lightwave Technology, Vol 24, No 5, May 2006, pp 2207-2218. Liquid has also been used as a top cladding with a grating in a Si$_3$N$_4$ core as described in W. C. L. Hopman, et al., "Quasi-one-dimensional photonic crystal as a compact building block for refractometric optical sensors," IEEE Journal of Selected Topics in Quantum Electronics, Vol 11, No 1, January/February 2005, pp 11-16.

A Si$_3$N$_4$ waveguide integrated with an electro-optically active polymer is described in I. Faderl, et al., "Integration of an electrooptic polymer in an integrated optic circuit on silicon," IEEE Journal of Lightwave Technology, Vol 13, No 10, October 1995, pp 2020-2026.

However, the prior art does not provide any teaching concerning the creation of high confinement optical waveguides for use on an electro-optic substrate. For the reduction of device size and flexibility of design, such a waveguide structure is highly desirable.

An object of the present invention is to provide a high confinement waveguide for use on an electro-optic substrate and which can be optically coupled substantially adiabatically into a waveguide within the electro-optic substrate.

A further object of the present invention is to provide a high confinement waveguide on the electro-optic substrate having a small bend radius for higher device packing density.

A further object of the present invention is to provide a high confinement optical waveguide adapted to couple light from an electro-optic device into a passive optical device in an integrated hybrid optical device.

A further object of the present invention is to provide an electro-optic device including high confinement waveguides defining small device features and folded features for high packing density.

A further object of the present invention is to provide passive-electro-optic integrated devices including high confinement waveguides providing adiabatic light transfer from the passive to electro-optic device and vice versa.

SUMMARY OF THE INVENTION

The present invention has found that significant advantage can be obtained by creating high confinement waveguides directly on the electro-optic substrate, such as with SiN:Si on lithium niobate coupled to diffused waveguides such as Ti, or other waveguides within the electro-optic substrate, such as annealed proton exchange (APE) waveguides, in order to reduce the mode size for portions of the waveguide circuit. Generally, the high confinement waveguide will not be the only waveguide in the electro-optic device, because only the tail of the optical mode is transmitted through the electro-optic material in a high confinement waveguide. Consequently, the electro-optic effect is limited. This is acceptable for certain applications. It is preferred to combine the high confinement waveguide for small bend radius areas with Ti diffused waveguides for straight sections and for better mode size matching to optical fiber. Alternatively, a hybrid waveguide in which a high confinement core is coincident with a diffused waveguide of similar refractive indices can be created to provide optical transmission in the electro-optic substrate with a smaller mode size.

Accordingly, the present invention relates to a high confinement waveguide comprising: an electro-optic substrate having a refractive index $n_s$; an optical waveguide within the electro-optic substrate having a refractive index $n_w$ greater than $n_s$; a high confinement waveguide on the electro-optic substrate optically coupled to the optical waveguide, the high confinement waveguide having a refractive index $n_c$ greater than $n_s$ such that the electro-optic substrate induces total internal refraction within the high confinement waveguide, and a refractive index $n_c$ greater than $n_w$ such that most of the optical power will couple from the optical waveguide to the high confinement waveguide when the high confinement waveguide is in contact with the optical waveguide.

Another aspect of the present invention relates to an electro-optic device comprising: an electro-optic substrate having a refractive index $n_s$; at least one optical waveguide within the electro-optic substrate for transmitting an optical signal through the device for electrical modulation; at least one high confinement waveguide having a refractive index $n_c$ greater than $n_s$ optically coupled to the at least one optical waveguide through at least one taper for adiabatic transfer of the optical signal.

Another feature of the present invention provides an integrated optical device comprising: an electro-optic element disposed on an electro-optic substrate having a refractive index $n_s$; a passive optical element; and an optical waveguide circuit through the electro-optic element and the passive optical element, wherein the optical waveguide circuit includes a high confinement waveguide on the electro-optic element having a refractive index $n_c$ higher than $n_s$ and a high confinement waveguide on the passive optical element having a refractive index $n_p$ optically coupled to the high confinement waveguide of the electro-optic element.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be described in greater detail with reference to the accompanying drawings which represent preferred embodiments thereof, wherein:

FIGS. 15A and 15B are color-enhanced graphic plots of the optical E-field of the coupler of FIGS. 11 and 13 as 3D BPM simulations calculated at several cross-sections from the first adiabatic taper to the center FIG. 15A, and from the center to the second adiabatic taper FIG. 15B;

DETAILED DESCRIPTION

Figure 4:
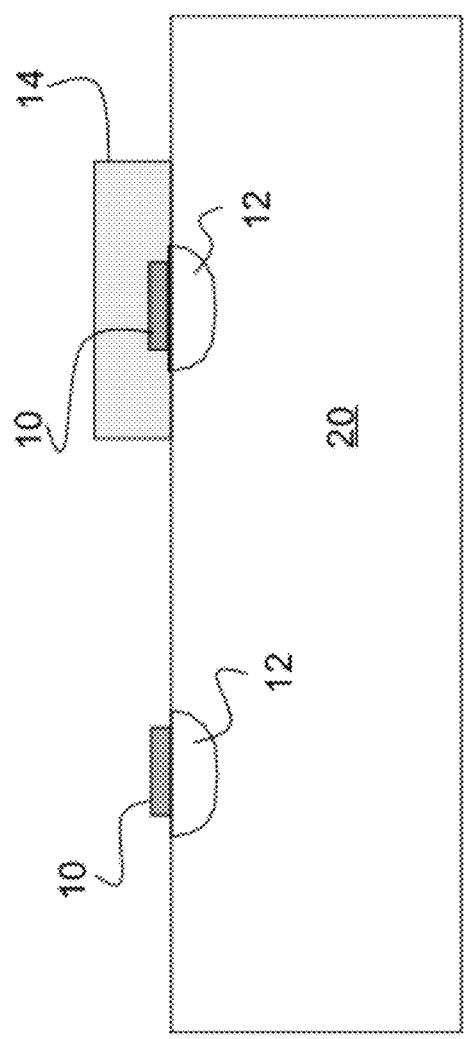
FIG. 4 is a cross-section of two high confinement waveguides in accordance with the present invention.
Figure 5:
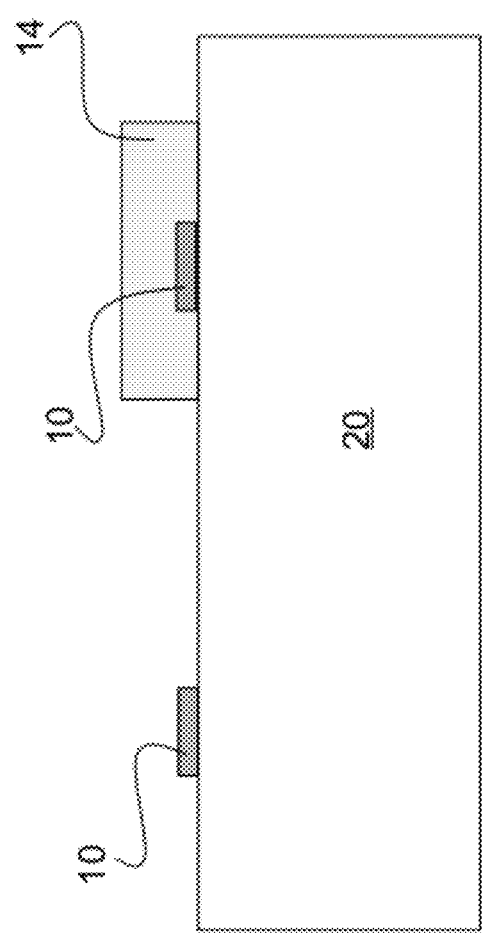
FIG. 5 is a cross-section of two alternate high confinement waveguides in accordance with the present invention.
Figure 6:
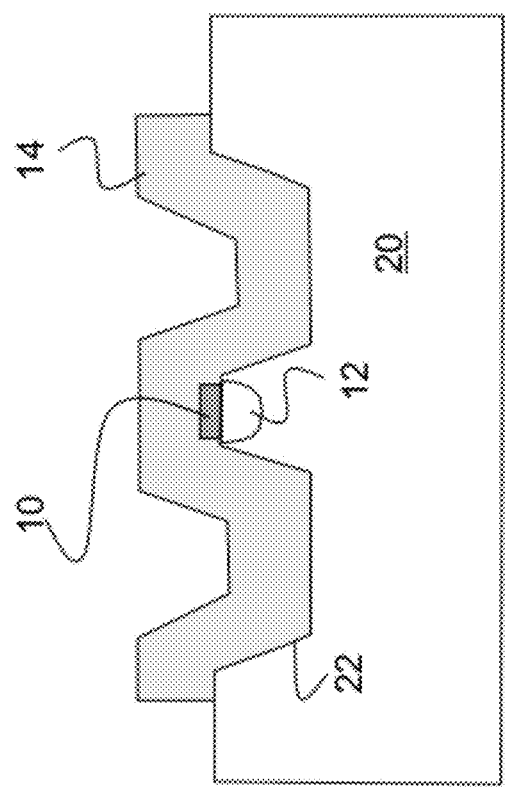
FIG. 6 is a cross-section of a high confinement waveguide in combination with a ridge formed substrate as often used in modulator structures.

FIGS. 4-31 describe various embodiments of the invention, which consist of a high confinement waveguide, like SiN:Si, formed on top of an electro-optic material, like lithium niobate (LN). FIGS. 4-6 show the cross sections of different types of SiN:Si-on-LN waveguides. The SiN strip 10 is made to be rich in Si, increasing its optical index of refraction to be slightly higher than the optical index of LN 20. A high confinement waveguide must have an index change relative to the electro-optic substrate that is significantly larger than that created in the diffused waveguide. The maximum refractive index in a diffused waveguide in lithium niobate is typically 0.01 to 0.02 higher than the substrate index or said another way, the index change forming the waveguide is less than 1% of the substrate index. Furthermore, the average index change in most of the waveguide is less than the maximum index change as a result of creating a waveguide with a diffusion process, hence the average index change may be less than 0.5%. A high confinement waveguides made with a SiN strip having an index of refraction 0.05 or more above that of the substrate has an average index change that is at least 2% of the substrate index, which is several times larger than that created within the diffused waveguide. Generally, the index change of the high confinement waveguide should be at least 0.02 and as high as 0.2. More preferably the index change is 0.02-0.1. And most preferably the index change is 0.05.

A diffused waveguide 12, such as of Ti, or other materials (nickel, magnesium-oxide, zinc oxide, rare earth, etc.), is present in the electro-optic substrate 20 at least to couple light into or out of the high confinement waveguide 10, and often for more substantial overlap. The titanium is diffused into the LN at high temperatures to form the Ti-diffused waveguide. As mentioned above, the Ti waveguide 12 brings the optical signal into the electrically active region of the substrate 20. When the light is guided by the high confinement waveguide 10, very little of the optical signal is exposed to the electrical field. Also, the larger mode size of the diffused waveguide 12 provides a better match for coupling into optical fiber. Normally, most of the optical power is carried in the SiN:Si strip 10, regardless whether the SiN:Si strip 10 is on undoped LN 20 as shown in FIG. 5, or if the SiN:Si strip 10 is on top of a Ti-diffused LN waveguide 12 as shown in FIG. 4. FIG. 4 shows an SiN:Si-on-LN waveguide 10 with and without an upper cladding 14 consisting of doped or undoped $SiO_2$, a material found in many LN modulators. Dopants may be introduced to tailor either electrical and/or optical properties of the $SiO_2$. The upper cladding 14 can function to protect the SiN:Si-on-LN waveguide 10, and can also include a bleed layer like TaSiN on top of it, to bleed off pyroelectric charge from the LN 20 and/or act as encapsulant, to keep out moisture. FIG. 5 shows SiN:Si-on-LN waveguides 10 that consist only of the SiN:Si strip 10 on LN 20, without the Ti-diffused waveguide.

FIG. 6 shows that the SiN:Si-on-LN waveguide 10 can be used in combination with etched slots 22 that form ridges in the substrate 20, which are often used to improve modulation efficiency in LN modulators. This structure allows for modulation along a tight bend. Note that the SiN:Si material is electro-optically inactive, however, the tail of the mode is within the electro-optically active substrate. Most likely, the modulation within a SiN:Si-on-LN waveguide will be much weaker than within a LN waveguide, as most of the optical power is confined to the SiN. The ridge structure improves modulation efficiency, to help offset some of the loss of modulation efficiency due to the electro-optic inactivity of the SiN.

Figure 7:
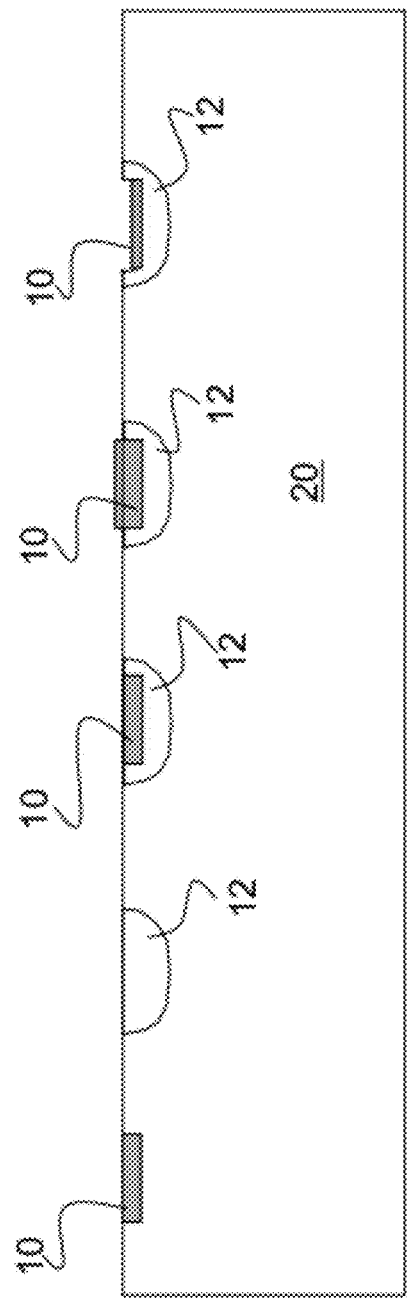
FIG. 7 is a cross-section of several high confinement waveguides partially or completely buried in the electro-optic substrate.
Figure 8:
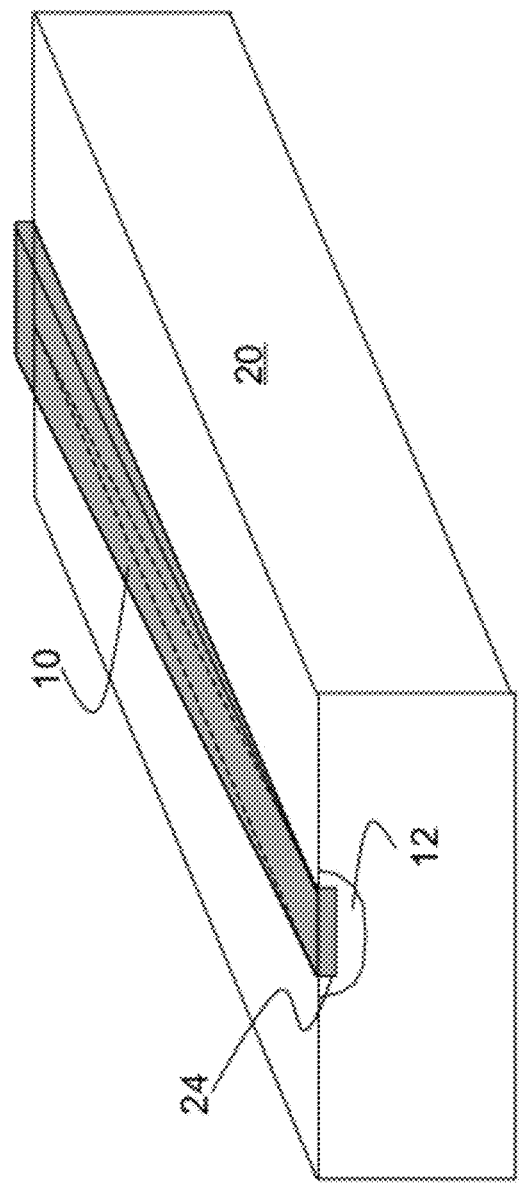
FIG. 8 is an isometric view of a high confinement waveguide formed in a trench having a tapered depth in the electro-optic substrate enabling a gradual transition from low to high confinement.

FIGS. 7 and 8 show how the SiN:Si strip 10 may be partially or completely buried within the LN substrate 20. Burying the SiN:Si strip 10 reduces the lateral index change, reducing confinement in the strip to reduce optical loss in the transition from a larger mode Ti-diffused waveguide 12 to the hybrid SiN:Si plus Ti-diffused waveguide. Burying the SiN:Si strip 10 also increases the amount of mode tail in the electro-optic substrate, thereby improving modulation efficiency. Depositing the SiN:Si material 10 into a wedge shaped trench 24 causes the volume of SiN:Si contained within the lithium niobate 20 to be gradually reduced as the material fills the trench 24 conformally and more of the strip 10 is surrounded by air, as shown in FIG. 8. This increases confinement in a more gradual manner, thereby reducing optical loss from lower confinement to high confinement power transfer. Alternatively the confinement can be modified gradually by using periodic segmentation of the high confinement waveguide 10 alternating high confinement material in a progressing duty cycle with a cladding material having an index of refraction closer to the index of the high confinement waveguide than air the transition medium. For example, the cladding in the region with periodic segmentation could be stoichiometric SiN, which has an index close to that of LN and SiN:Si. The cladding could cover all of the high confinement waveguide. Alternatively, the SiN cladding could also be patterned, to put it only in locations having periodic segmentation. Tapering the width of the upper cladding from wider to less than that of the SiN:Si strip 10 would reduce the scattering loss at the transition from regions with upper cladding to those without.

Figure 1:
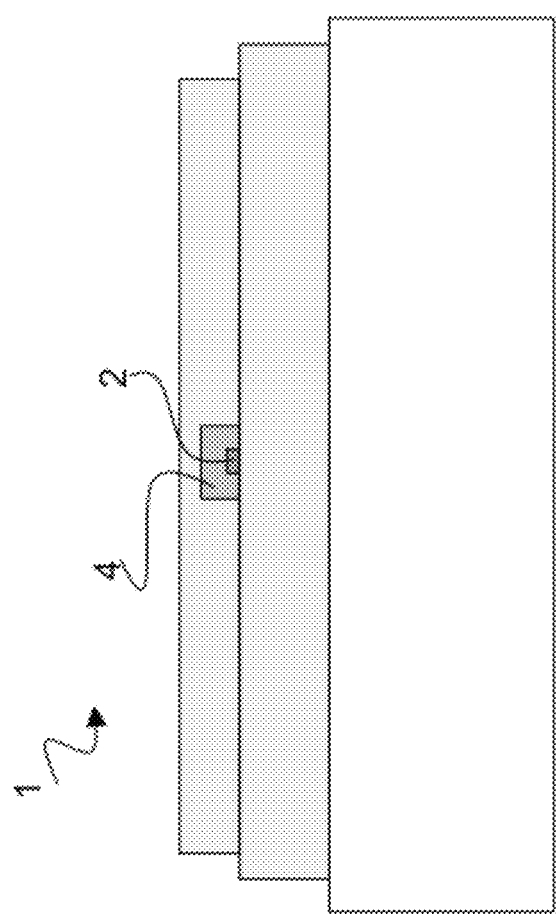
FIG. 1 is a cross-section of a prior art hybrid SiN silica waveguide.
Figure 2:
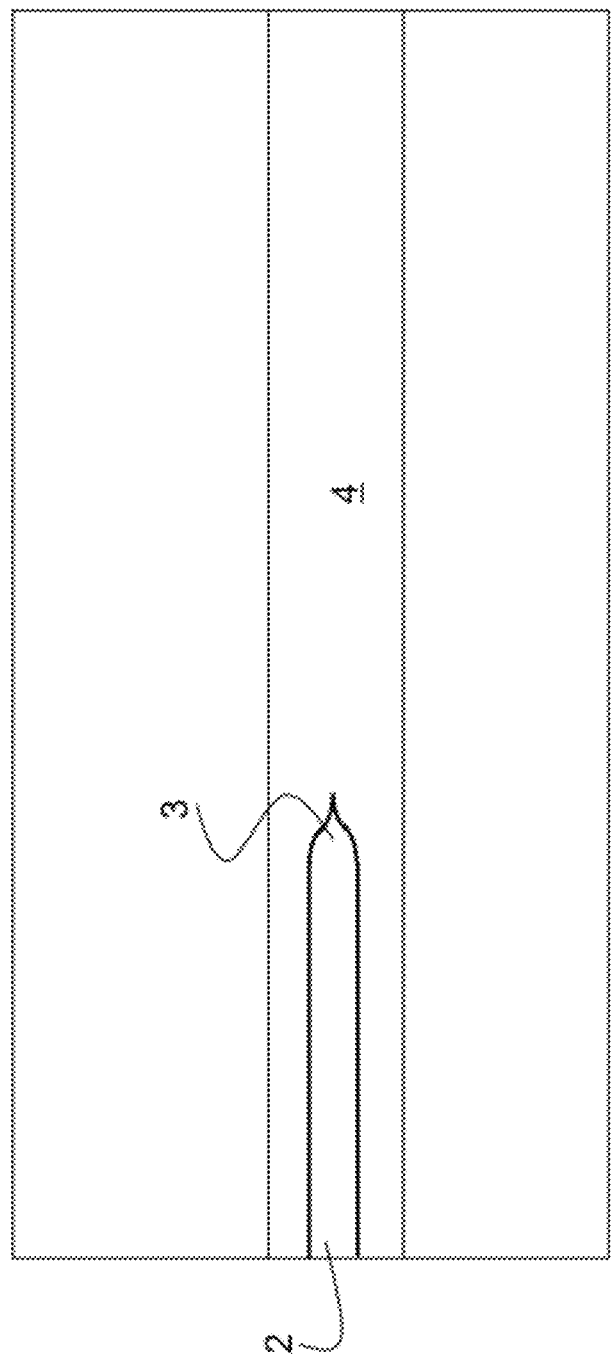
FIG. 2 is a top view of the prior art waveguide of FIG. 1 illustrating an optical adiabatic taper.
Figure 3:
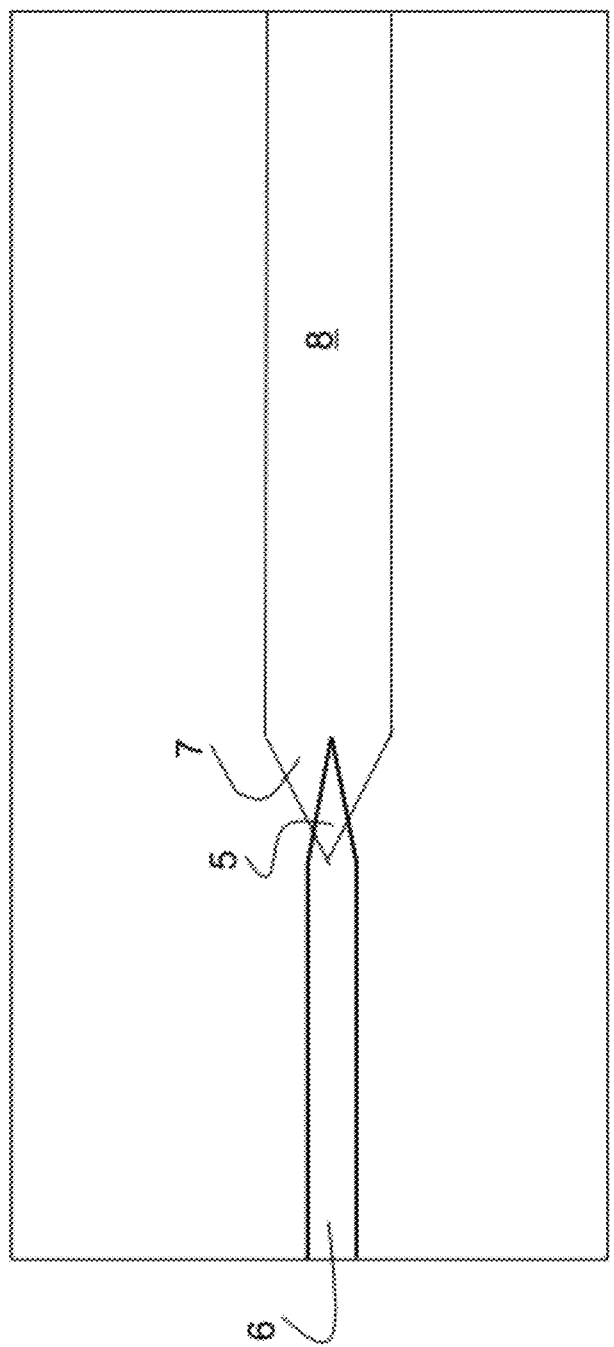
FIG. 3 is a top view of a prior art transition of overlapping tapers between conventional silica and SiN waveguides for adiabatic transfer of optical power.
Figure 9:
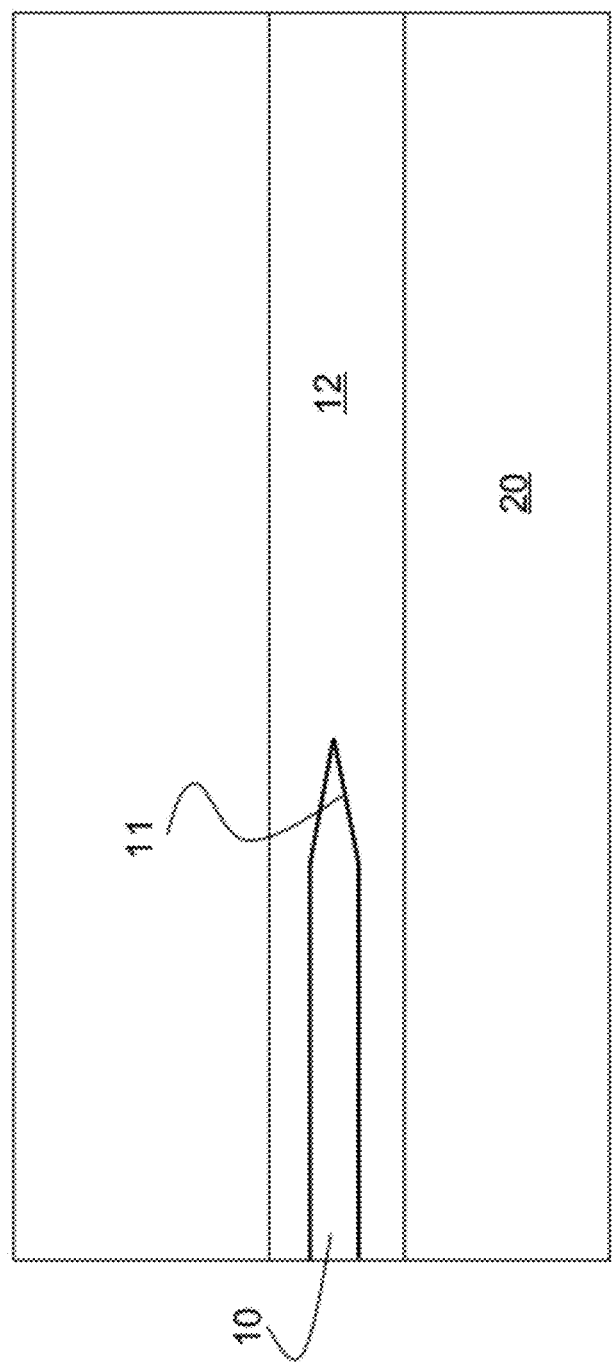
FIG. 9 is a top view of an adiabatic taper for use in the present invention similar to the taper of FIG. 2.
Figure 10:
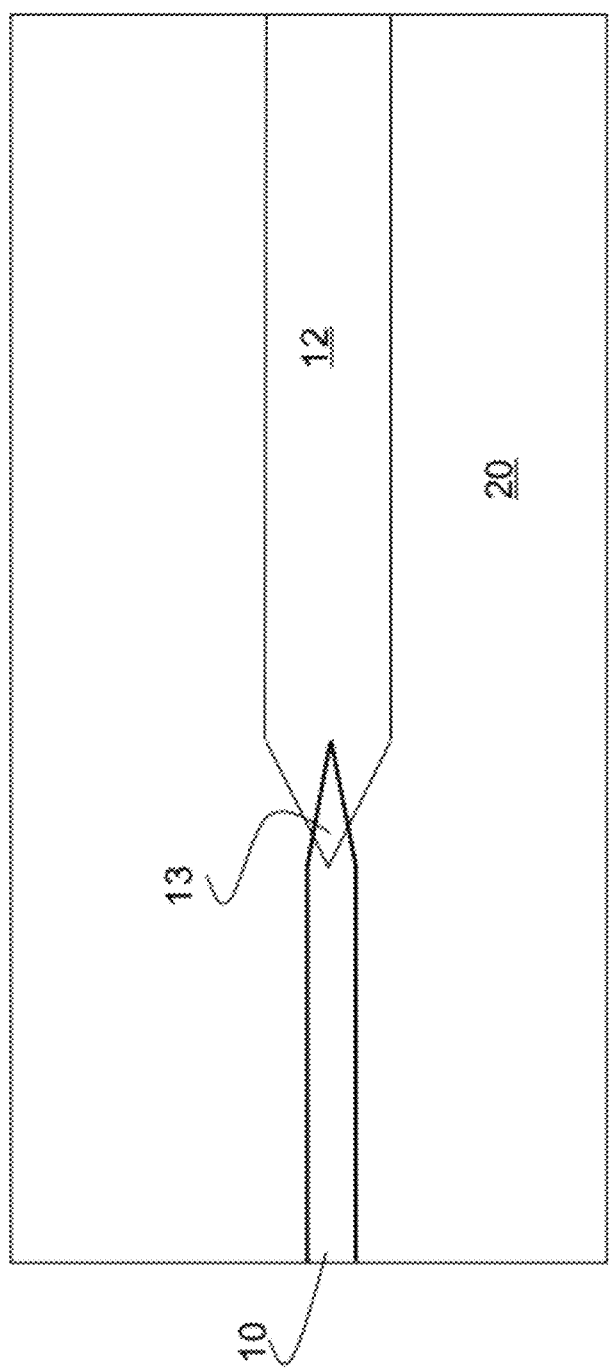
FIG. 10 is a top view of a transition made of overlapping tapers for use in the present invention similar to FIG. 3.

Shani et al. provide a useful definition for "adiabatic." As used in this application, it means that the occupations of the optical modes of the system do not change as the waveguide structure changes. If the fundamental mode is initially excited, all the power stays in the fundamental mode as the waveguide structure and hence the mode shape changes. No power is coupled to other modes or radiated into the continuum. FIG. 9 shows an adiabatic taper 11 similar to prior art FIG. 2 in layout. The taper 11 transfers power vertically from diffused waveguide 12 in LN 20 to the SiN:Si strip 10 on LN 20. The shape and size of the mode changes dramatically as the power is shifted from one waveguide to another. However, since the optical signal is attracted to the higher index contrast, very little optical power is lost in the transfer. FIG. 10 shows another taper design 13 similar in layout to that in prior art FIG. 3. In FIG. 10, the power is adiabatically transferred vertically from the SiN:Si strip 10 to the diffused waveguide 12 in LN 20, or vice-versa, depending on which direction the light is propagating. The cross section of the tapers in FIGS. 9 and 10 are similar to that shown in FIG. 4, for the sections where the diffused waveguide width is wider than the SiN:Si strip width.

Figure 11:
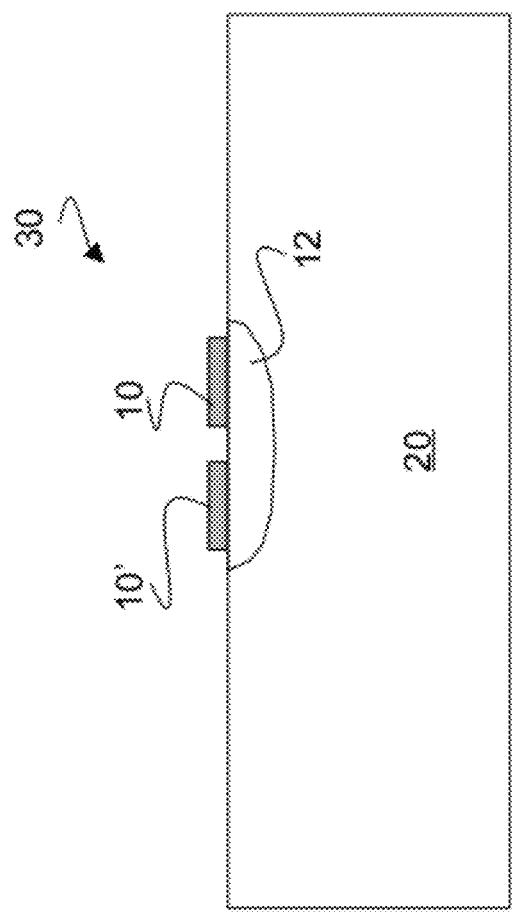
FIG. 11 is a cross-section of an optical coupler in accordance with the present invention for horizontal evanescent coupling.
Figure 12:
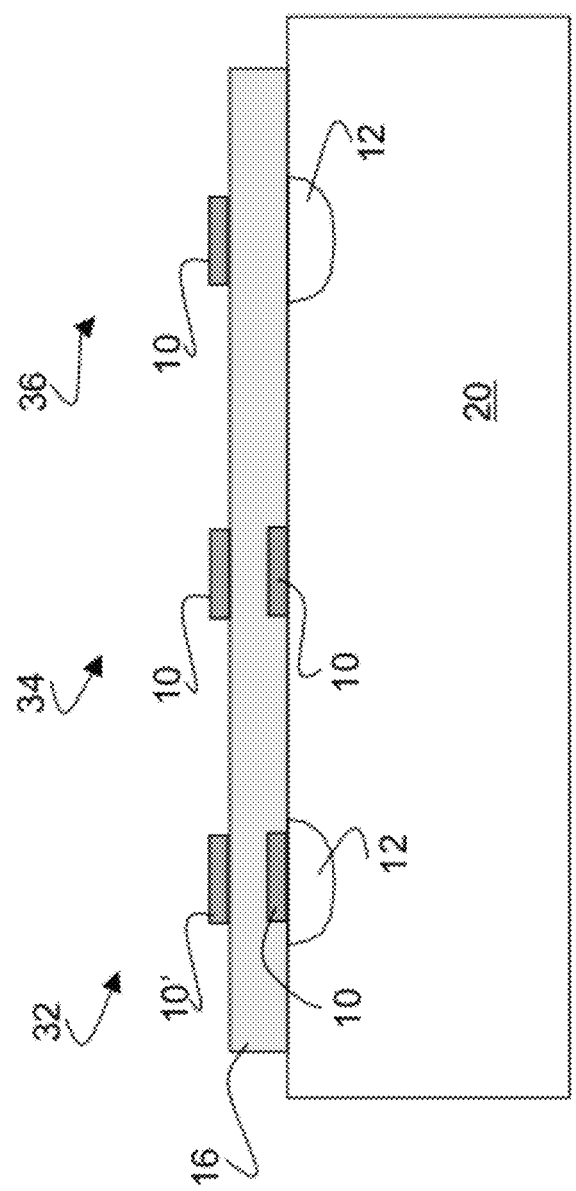
FIG. 12 is a cross-section of three examples of optical couplers for vertical evanescent coupling.

Other waveguide structures can be designed with the high confinement waveguides. FIGS. 11 and 12 show the cross sections of SiN:Si-on-LN optical couplers with either horizontal or vertical evanescent coupling. The horizontal coupler 30 is simpler to fabricate, though, requires precise control of lateral dimensions. The vertical coupler 32, 34, 36 is more complex, but requires precise control of vertical dimensions, which are sometimes easier to control with great precision. The structure in FIG. 11 includes a Ti-diffused waveguide 12 to facilitate coupling between the optical modes in the SiN:Si waveguides 10. The modes have more overlap within the Ti-diffused waveguide 12 than they do in the region above the LN, where there is a huge index change.

FIG. 12 shows three versions of a vertical coupler using a SiN:Si-on-LN waveguide. In vertical coupler 32, the lower SiN:Si-on-LN waveguide 10 has a Ti-diffused waveguide 12 below it, though, the coupling occurs within the $SiO_2$ buffer layer 16, where the mode tails of the two SiN:Si waveguides 10 overlap. The vertical coupler 34 has one SiN:Si strip 10 directly on top of the LN 20 and a second one directly over top of it with the buffer layer 16 in between. There is no Ti-diffused waveguide in coupler 34. Vertical coupler 36 consists of a Ti-diffused waveguide 12 and an SiN:Si strip 10 on top of the buffer layer 16. The amount of coupling may be low in coupler 36, as the mode indices of the two waveguides are probably different enough to spoil the coupling. The coupler 36 can function well as a tap coupler, where the desired amount of coupled light is small. Note also that the optical index of refraction of the LN substrate may change more with wavelength than the optical index of the SiN:Si material, causing the amount of coupling to be wavelength dependent.

The variation in LN substrate index with wavelength can be used to compensate for the variation in coupling caused by mode overlap. For example, the tail of the LN mode in coupler 36 in the $SiO_2$ buffer layer may get larger with increasing wavelength, leading to more coupling. If the optical index of the SiN:Si is slightly larger, but close to that of the Ti-indiffused waveguide, the amount of optical phase mismatch between the modes of the two waveguides will actually increase with wavelength, possibly offsetting the increased coupling due to more mode overlap. The optical phase mismatch increases due to the wavelength dependence of the index of the LN substrate which has a refractive index which decreases with wavelength. If the SiN:Si waveguide propagation constant is roughly constant with wavelength, then the difference in optical propagation constants will increase with wavelength. The competing effects of mode overlap and optical phase mismatch can be used to create a coupler that has a coupling ratio that is roughly constant over some wavelength range.

Figure 13:
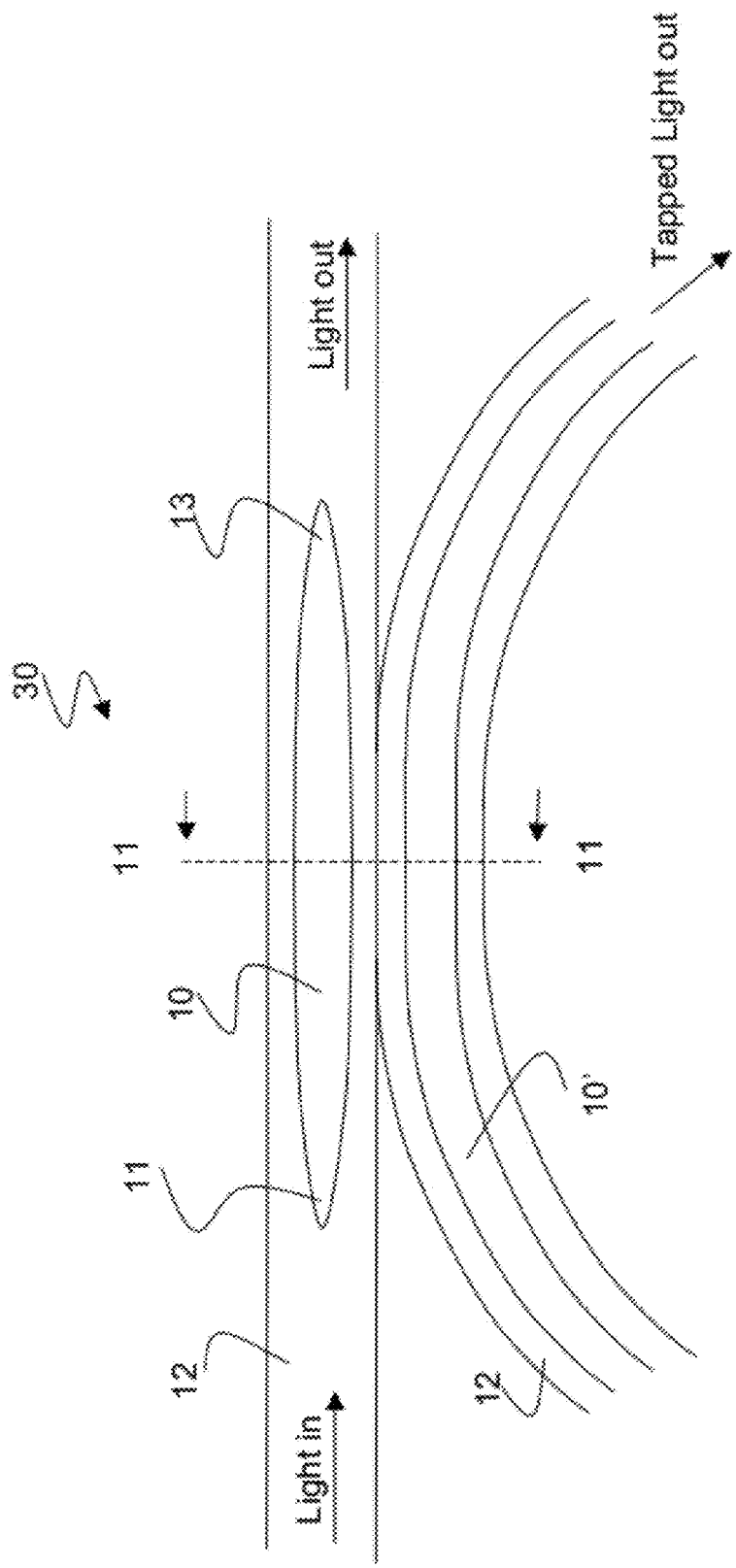
FIG. 13 is a top view of the coupler of FIG. 11.
Figure 14:
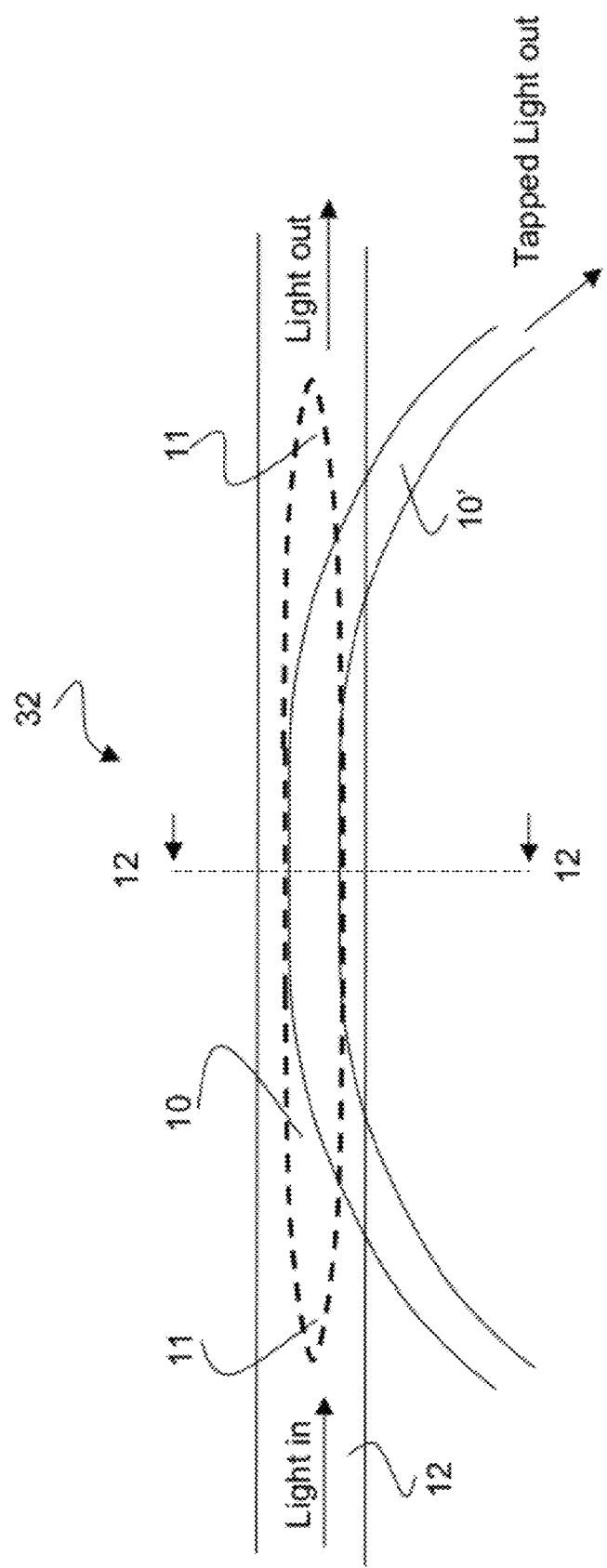
FIG. 14 is a top view of one of the couplers of FIG. 12.

FIGS. 13 and 14 show top views of the couplers described in FIGS. 11 and 12. In FIG. 13, the Ti-diffused waveguides actually merge in the coupling region. Line 11-11 shows the section shown in FIG. 11 through the center of the coupling region. Adiabatic tapers 11 and 13 transfer power from the diffused waveguide 12 into the SiN:Si strip 10 and back again. Within the coupling region, most of the light is within the SiN:Si strip 10 on top of the straight waveguide 10, however, some light is carried within the diffused waveguide 12, and there is some overlap of the optical modes of the two hybrid waveguides within the merged diffused waveguide region. The overlap is large enough to permit some optical power to be transferred to the tap waveguide 10' that has the sharp waveguide bends. The sharp waveguide bends permit the tapped light to be redirected away from the straight waveguide in a short distance, making it possible to integrate the coupler in a short section of straight waveguide. FIG. 14 shows a top view of coupler 32 of FIG. 12. Section line 12-12 shows the cross-section through the center of the coupling region as shown in FIG. 12. An adiabatic taper 11 transfers much of the optical power into the first SiN:Si strip 10 on top of the LN. Evanescent coupling to the second SiN:Si strip 10' on top of the buffer layer 16 transfers some optical power to the second SiN:Si strip 10'. The tapped power is directed away from the bottom optical waveguide 10 with a tight bend in the second SiN:Si strip 10'.

FIG. 15A and 15B show color-enhanced plots from a 3D BPM simulation of the horizontal coupler shown in FIGS. 11 and 13. Plots of the cross section of the optical E-field along the coupler are stacked on top of one another. The first stack of plots in FIG. 15A shows the first adiabatic taper 11 and coupled section, including the bends for the tap arm of the coupler. About 3% of the optical power is coupled into the tap arm. The second stack of plots in 15B shows the second adiabatic taper 13, where light is transferred from being mostly in the SiN:Si strip back into the diffused waveguide. Note the dramatic change in mode size in shape resulting from transfer of optical power between the conventional Ti-diffused and hybrid SiN:Si-on-LN waveguide. The smaller mode size of the hybrid SiN:Si-on-LN waveguide makes tighter waveguide bends possible, which greatly reduces the device length needed for a tap coupler. In fact, most likely the tap coupler could be integrated into an LN modulator without adding any device length.

Figure 17:
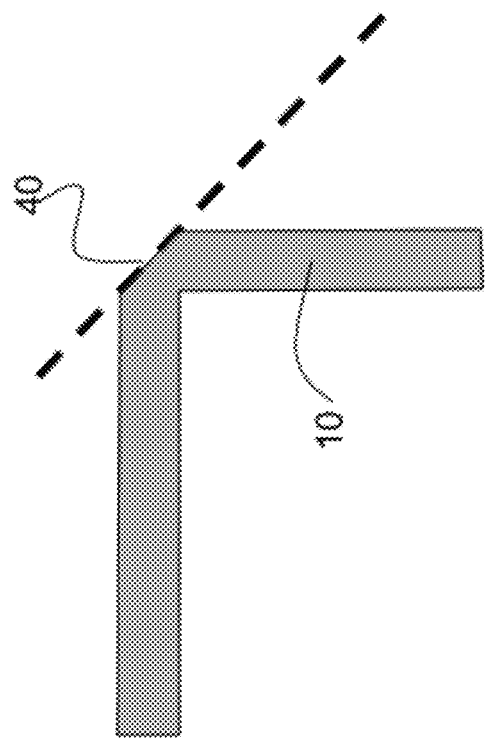
FIG. 17 is a top view of an alternate structure of an abrupt bend in a high confinement waveguide.
Figure 16:
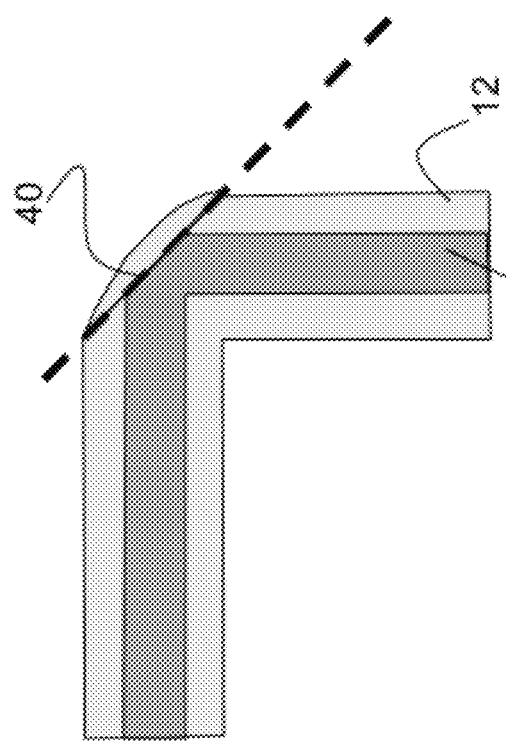
FIG. 16 is a top view of an abrupt bend in the high confinement waveguide in accordance with the present invention.
Figure 18:
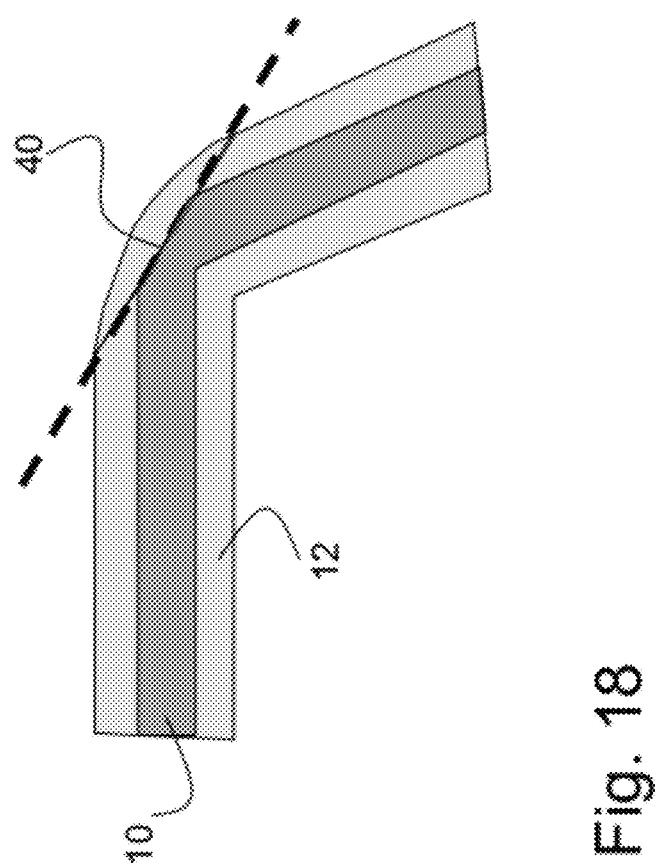
FIG. 18 is a top view of a further alternate structure of an abrupt bend in a high confinement waveguide.

FIGS. 16, 17 and 18 show top views of abrupt bends that have a beveled corner 40 that acts like a mirror. The SiN:Si strip 10 has a vertical sidewall at the beveled corner 40, fabricated by either etching or lift-off. The vertical sidewall is necessary for low optical loss at the abrupt bend. The large index contrast of the high confinement waveguide makes this possible without additional metallization of the reflector structure. FIGS. 16 and 17 show 90° abrupt bends with or without a Ti-diffused waveguide 12 underneath the SiN:Si strip 10, respectively. FIG. 18 shows an abrupt bend with a Ti-diffused waveguide, where the bend angle is less than 90°. Multiple abrupt bends having individual bend angles less than 90°, but an accumulated bend angle of 90°, might have lower optical loss from radiated or scattered light than one single 90° bend.

There are multiple applications of SiN:Si-on-LN waveguides. The SiN:Si-on-LN or other high confinement waveguide facilitates tighter optical bends than are possible with a diffused waveguide like Ti-diffused. Other materials can be used in place of SiN:Si. The main criteria is that (1) the optical index must be slightly higher than the LN substrate optical index, and also larger than the optical index of the Ti-diffused waveguide, and (2) the optical absorption and optical scattering losses must be low. To be practical, the propagation loss in the SiN:Si-on-LN waveguide must be less than 1 dB/cm, and losses in the adiabatic tapers, where light is transferred from one type of waveguide to another, must be less than a few tenths of a dB.

Figure 19:
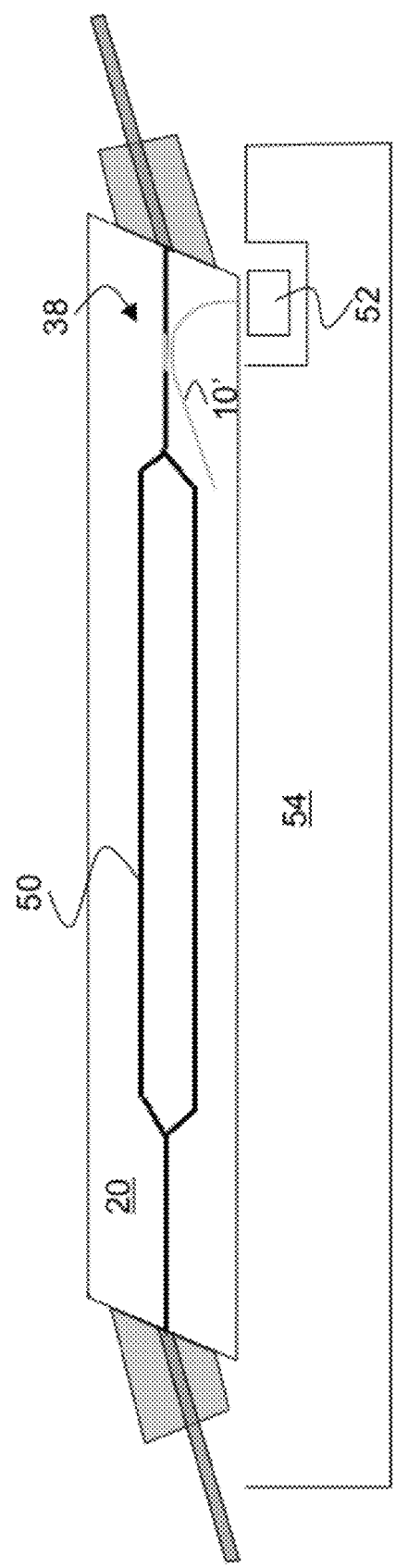
FIG. 19 is a schematic view of an electro-optic chip including a tap coupler with a sharp bend for guiding tapped light to the edge of the electro-optic chip.

FIG. 19 shows a SiN:Si-on-LN coupler 38 similar to the ones described in FIGS. 11-15 as integrated into an electro-optic Mach-Zehnder device 50. The higher confinement allows one arm 10' of the coupler 38 to bend 90° to guide the tapped light to the side of the LN chip 20, where the tapped light is directed to a photodetector 52 mounted on the shelf 54 of the package holding the chip.

Figure 20:
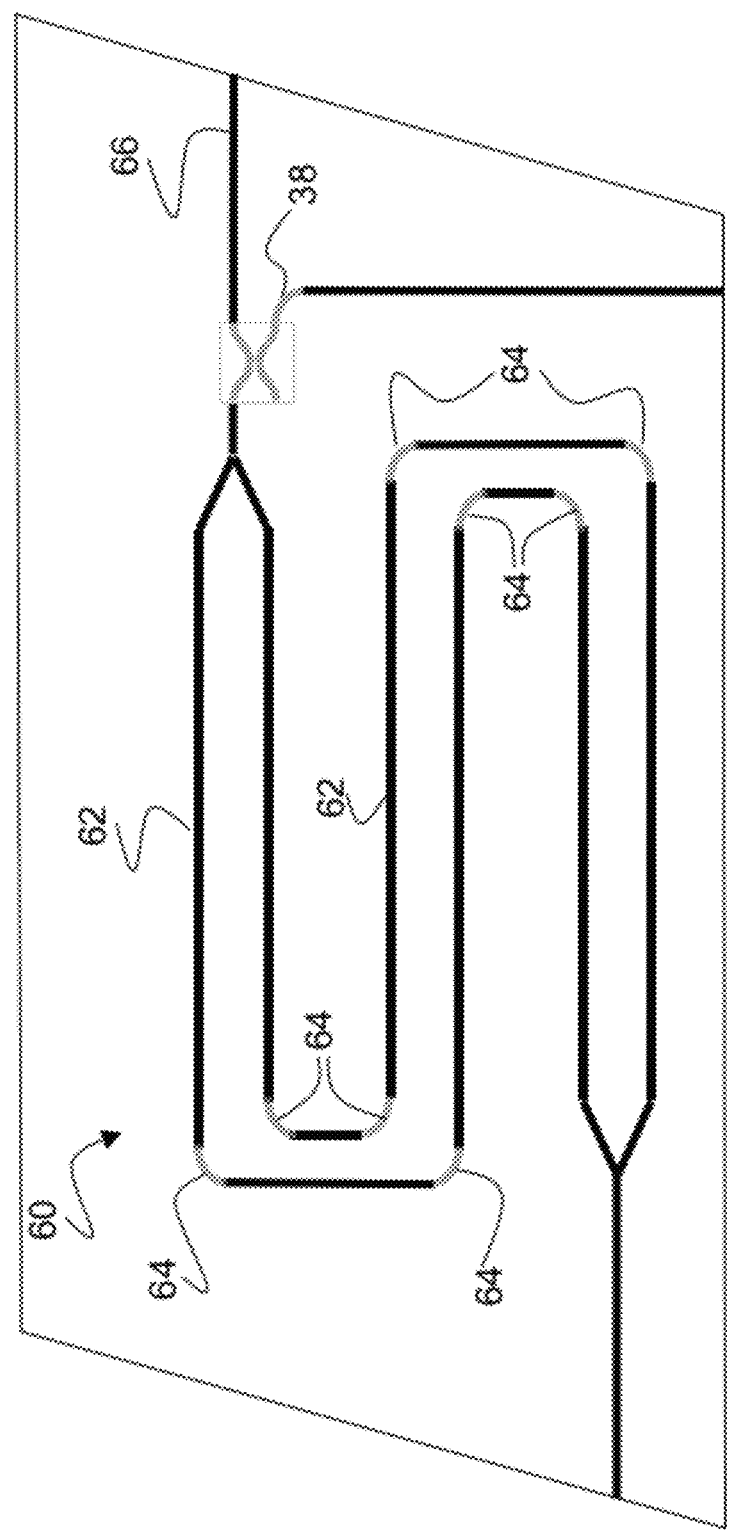
FIG. 20 is a schematic illustration of a folded Mach Zehnder modulator using sharp bends in high confinement waveguides to fold the modulator.

FIG. 20 shows the optical waveguides 62 of a folded modulator 60 using 90° SiN:Si waveguide bends 64 to fold the MZ. The bends may use one or more abrupt bends with a beveled corner as shown in FIGS. 16-18 or an arc with a small radius. Tap coupler 38 is illustrated at the modulator output 66. By folding the modulator 60, a much longer interaction length can be achieved without requiring a large dimension in the chip.

Figure 21:
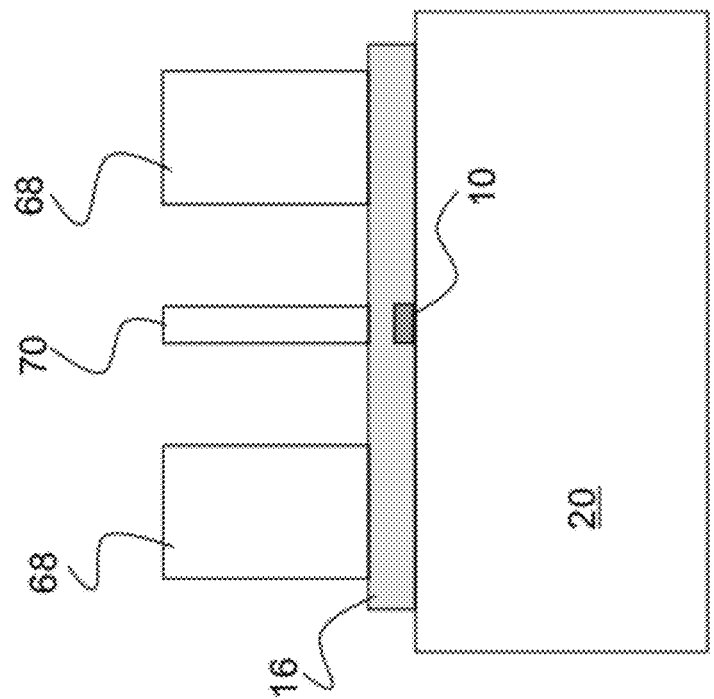
FIG. 21 is a cross-section of a SiN on LN waveguide with a buffer layer and electrode on top to provide modulation.
Figure 22:
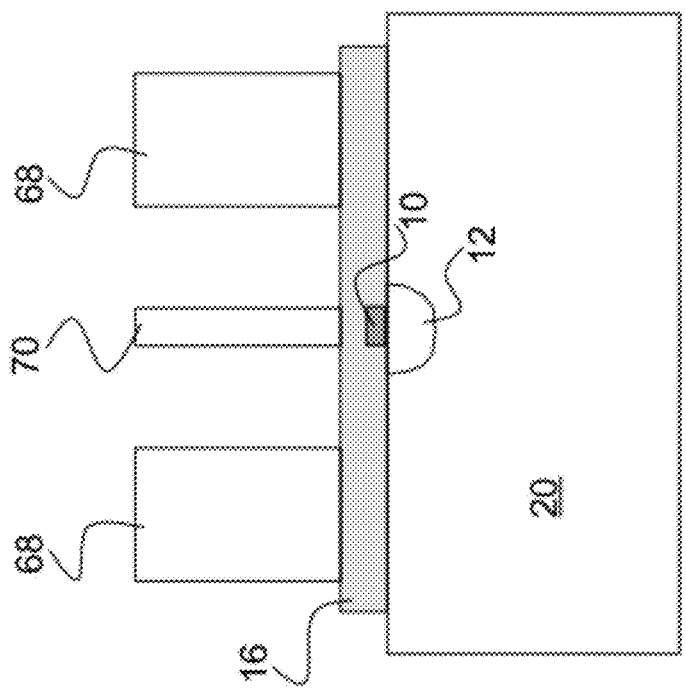
FIG. 22 is a cross-section of an alternative SiN on LN waveguide as shown in FIG. 21.

FIGS. 21 and 22 show a SiN-on-LN waveguide 10 in cross-section with a buffer layer 16 and electrodes 68, 70 on top to provide modulation. The structure shown in FIG. 21 has a Ti-diffused waveguide 12 underneath the SiN strip 10, while the one in FIG. 22 does not. Note that only the Ti-diffused waveguide and LN substrate are electro-optically active. The SiN:Si strips are electro-optically inactive.

The structures in FIGS. 21 and 22 make it possible to modulate the light along a tight bend, thereby increasing the level of integration. However, there is a huge trade-off between how tight the bend can be and the strength of modulation. The greater the confinement and more of the optical mode that resides within the SiN:Si, the tighter the bend can be at expense of modulation efficiency. Most likely modulation efficiency will be much lower than for a conventional LN waveguide, however, it may be adequate for certain applications that only require weak modulation, for example the fine tuning of a coupler coupling ratio. The modulation efficiency can also be improved by resonant structures discussed later.

Figure 23:
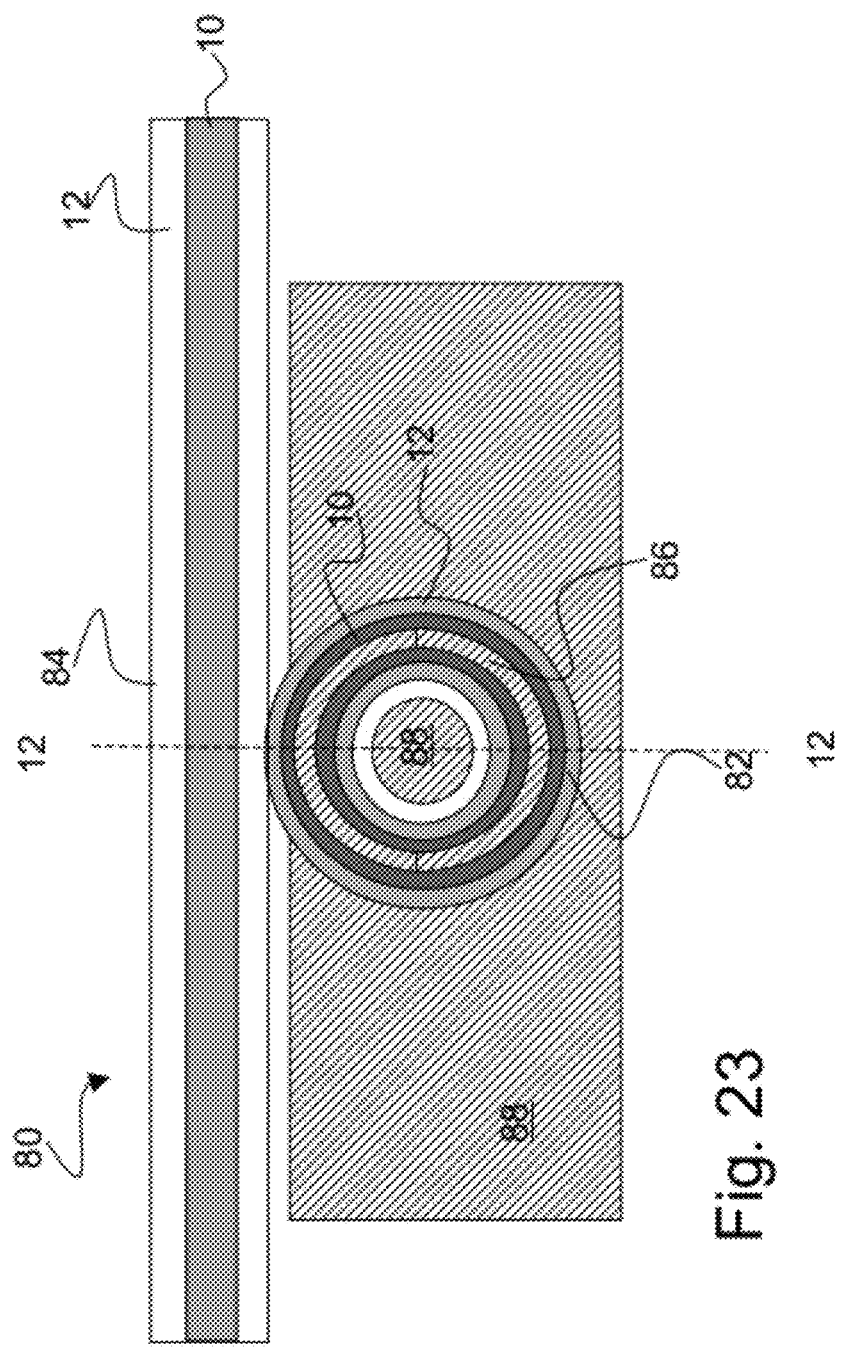
FIG. 23 is a top schematic view of an electro-optically controlled ring resonator.
Figure 23A:
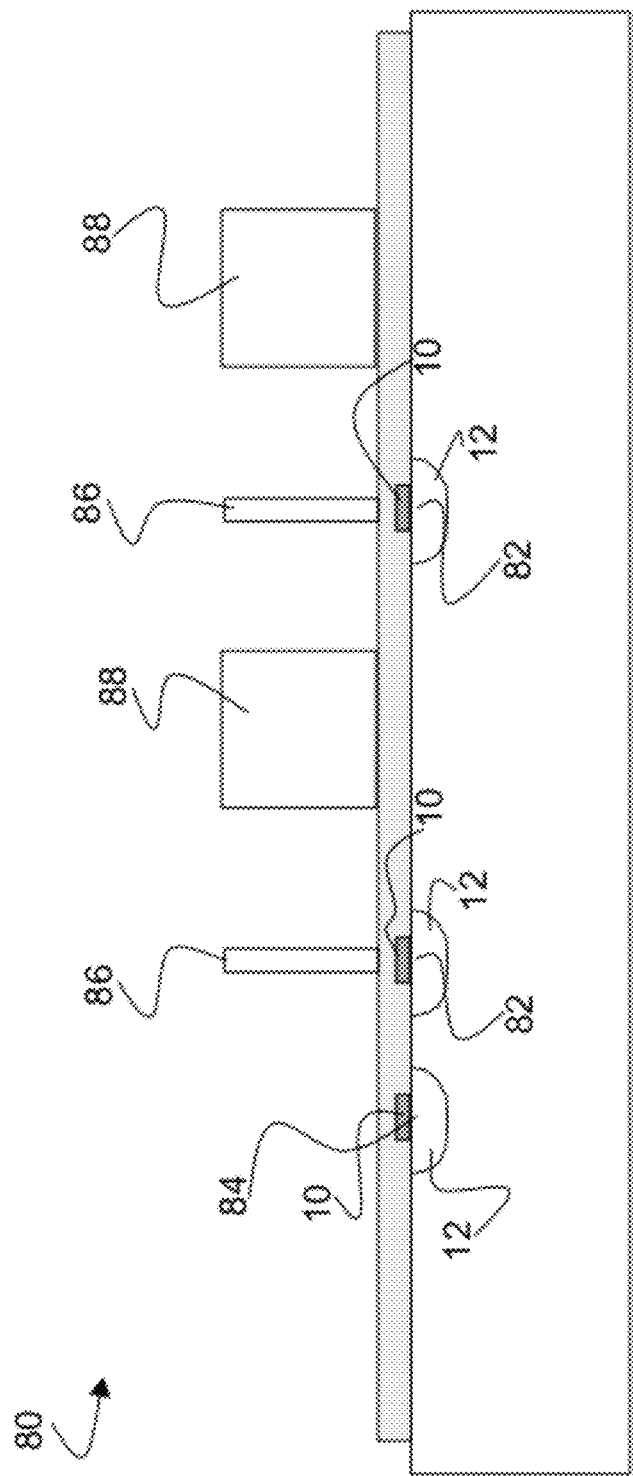
FIG. 23A is a cross-section of the ring resonator of FIG. 23 taken through line 12-12.

FIG. 23 shows another application of SiN:Si-on-LN waveguides, as an electro-optically controlled ring resonator shown schematically as 80. Ring resonators are being used to enhance modulation of light in Silicon waveguides as discussed in an article by B. Jalali, et al., "Silicon photonics," IEEE Microwave Magazine, June 2006, pp. 58-68. Light is coupled into the ring 82, making many passes around the ring. Each time around the ring, a small portion of the light is coupled out into the straight waveguide 84. Maximum transmission occurs when all the portions of light traveling in and out of the ring 82 are in phase with each other and in phase with the portion of light traveling through the straight waveguide 84. As illustrated the ring resonator 80 includes a hybrid waveguide of SiN 10 over Ti 12 for both the straight waveguide 84 and the ring 82. FIG. 23A shows a cross-section of the structure in FIG. 23. The optical index of the Ti-diffused waveguide and LN substrate are both affected by the applied field, allowing the optical mode index of the hybrid waveguide to be weakly tuned. The resonance wavelength of the ring resonator is shifted with the applied voltage on the signal electrode 86. Ground electrodes 88 surround the signal electrode 86. The ring resonator 80 functions as a tunable filter or modulator. A ring resonator can be formed without the Ti-diffused waveguide 12, however, the Ti-diffused waveguide enhances modulation efficiency by increasing the size of the tail of the mode in the electro-optically active LN.

One problem with high speed operation of ring resonators used to modulate light is the chirp in wavelength that occurs with the change in optical intensity. The push-pull configuration shown as ring resonator 90 in FIG. 24 helps to reduce the chirp due to the balanced nature of the Mach-Zehnder (MZ) Interferometer 92 having a ring 94 on each arm 96. The chirp produced by the two ring resonators 94 are approximately equal in magnitude but opposite in sign, resulting in little residual phase change for the light exiting the MZ 92 at waveguide 98. Note that more than one ring 94 can be serially integrated within each arm 96 of the MZ 92. In such an arrangement, all of the rings in one arm of the MZ would be biased to the same transmission point, and driven with +Vmod1, while all of the rings in the other arm of the MZ would be all biased to the same transmission point, and driven with −Vmod1.

Figure 25:
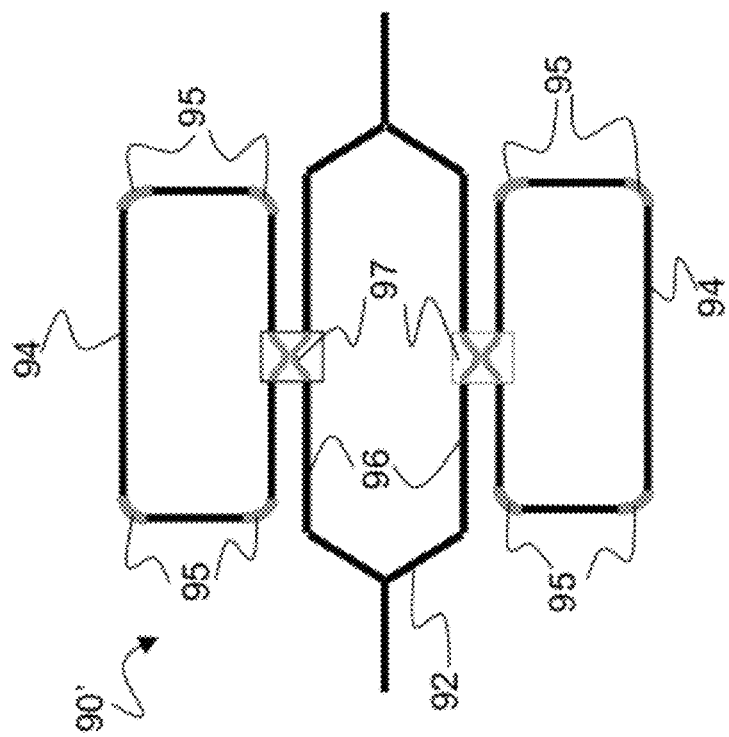
FIG. 25 is a schematic view of a further alternative ring resonator in accordance with the present invention.
Figure 24:
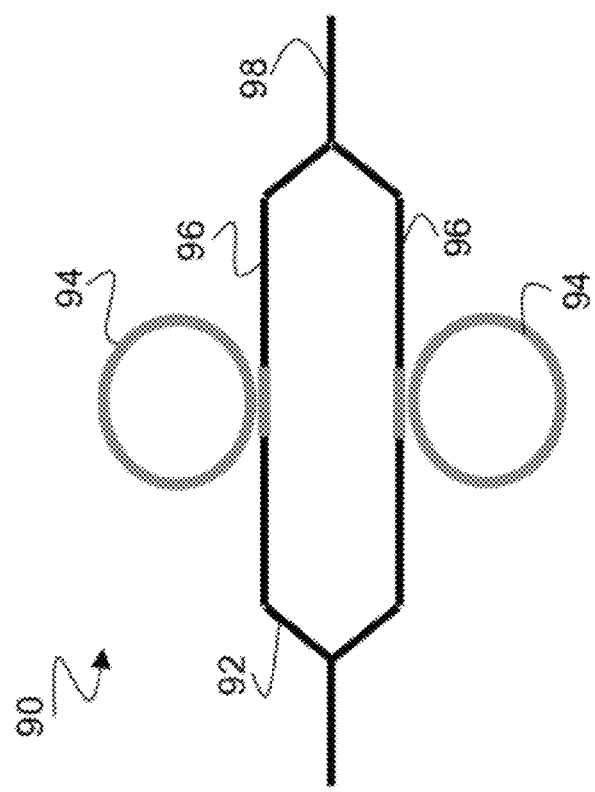
FIG. 24 is a schematic view of an alternative ring resonator configuration.

FIG. 25 shows a ring resonator topology 90' similar to that in FIG. 24, however, the SiN:Si-on-LN waveguides are only used at (1) the corners 95 of an oval shaped ring 94 and at (2) the couplers 97 used to couple light in and out of the ring 94. Adiabatic tapers, such as shown in FIG. 10, before and after each section of SiN:Si-on-LN allow light to be transferred back and forth between the high confinement SiN:Si-on-LN waveguides and highly electro-optically active Ti-diffused waveguides. The transfer of power between the two types of waveguides improves modulation electro-optic efficiency at the expense of higher optical loss in the ring, which results in lower finesse and reduced extinction ratio.

Figure 26:
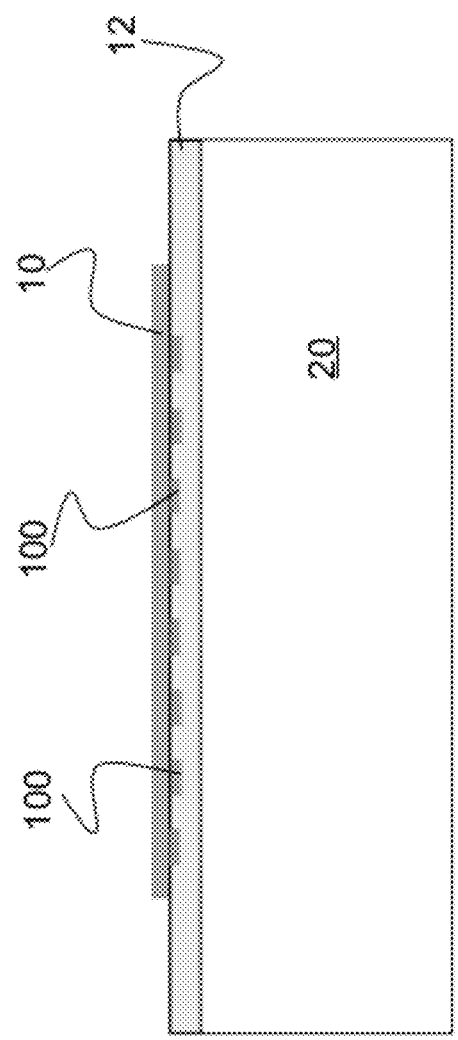
FIG. 26 is a schematic longitudinal section of a SiN on LN waveguide with a grating etched into the LN in accordance with a further embodiment of the present invention.

FIG. 26 shows an SiN:Si-on-LN waveguide 10 over a Ti-diffused waveguide 12 with a grating 100 etched into the LN 20. As with the ring resonator 80, 90, the wavelength of maximum or minimum transmission through the grating 100 can be tuned with an applied field from an electrode.

FIGS. 27-30 show how SiN:Si waveguides assist in hybrid integration of Silica-on-Silicon waveguide technology with lithium niobate modulator technology. There has been interest in integrating passive optical circuits with electro-optic devices for quite a few years. Recently interest in high speed switching has motivated development of a Mach Zehnder interferometer based switch architecture in which optical circuits including directional couplers are realized in passive PLC and only phase shifters are integrated in lithium niobate technology, as described by K. Suzuki et al., "High-speed optical 1×4 switch based on generalized Mach-Zehnder interferometer with hybrid configuration of silica-based PLC and lithium niobate phase-shifter array," IEEE Photonics Technology Letters, Vol 19, No 9, May 1, 2007, pp 674-676. A major problem addressed by this design is insertion loss (IL). Suzuki et al. reduce the IL by reducing the number of coupling points. Significant IL is still experienced at the interface between the silica and LN waveguides, which are butt coupled with an anti-reflective coating between them. Alignment at these points is critical. Hybrid integration of passive silicon waveguides with active III-V quantum layer structures has also been published by A. Fang, et al., "Hybrid silicon evanescent device platform," IEEE LEOS Newsletter, April 2007, pp 4-11. However, the optical power is never completely transferred to the active III-V material. Some or most of the optical power resides within the silicon waveguide structure.

Figure 27:
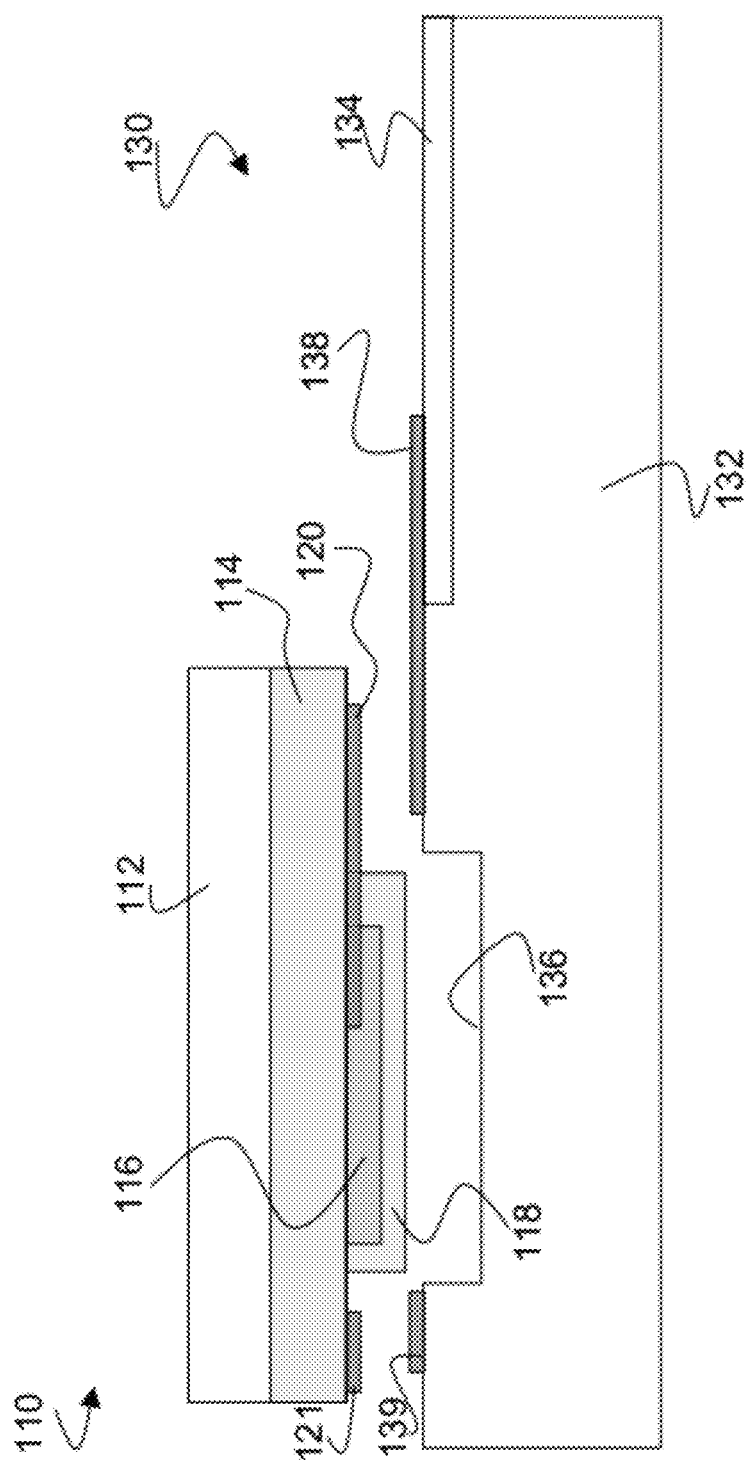
FIG. 27 is a schematic cross-section of a hybrid integration of a silica on silicon device to be optically coupled by a high confinement waveguide to an electro-optic chip in a flip-chip orientation.
Figure 28:
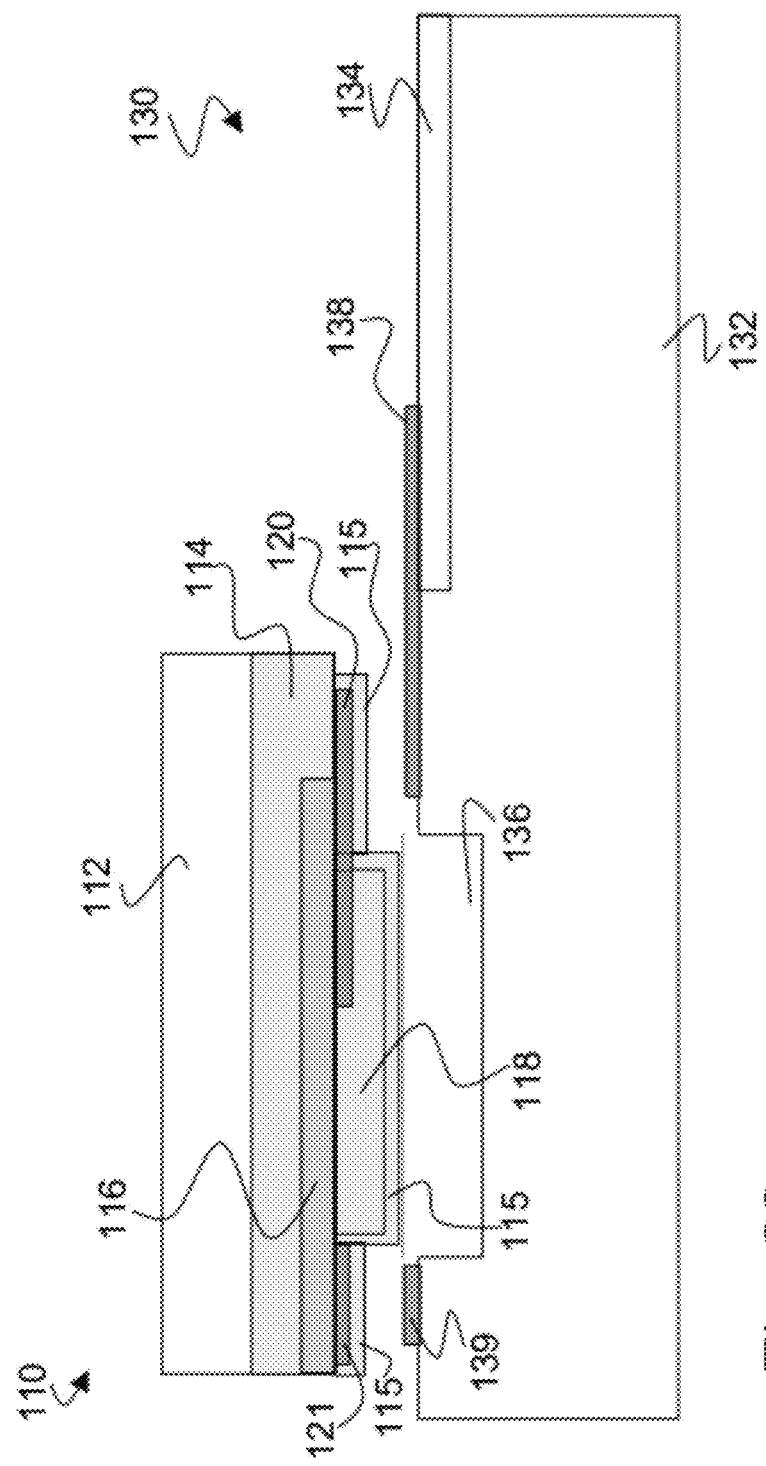
FIG. 28 is a schematic cross-section of an alternative structure of the hybrid integration of FIG. 27.
Figure 29:
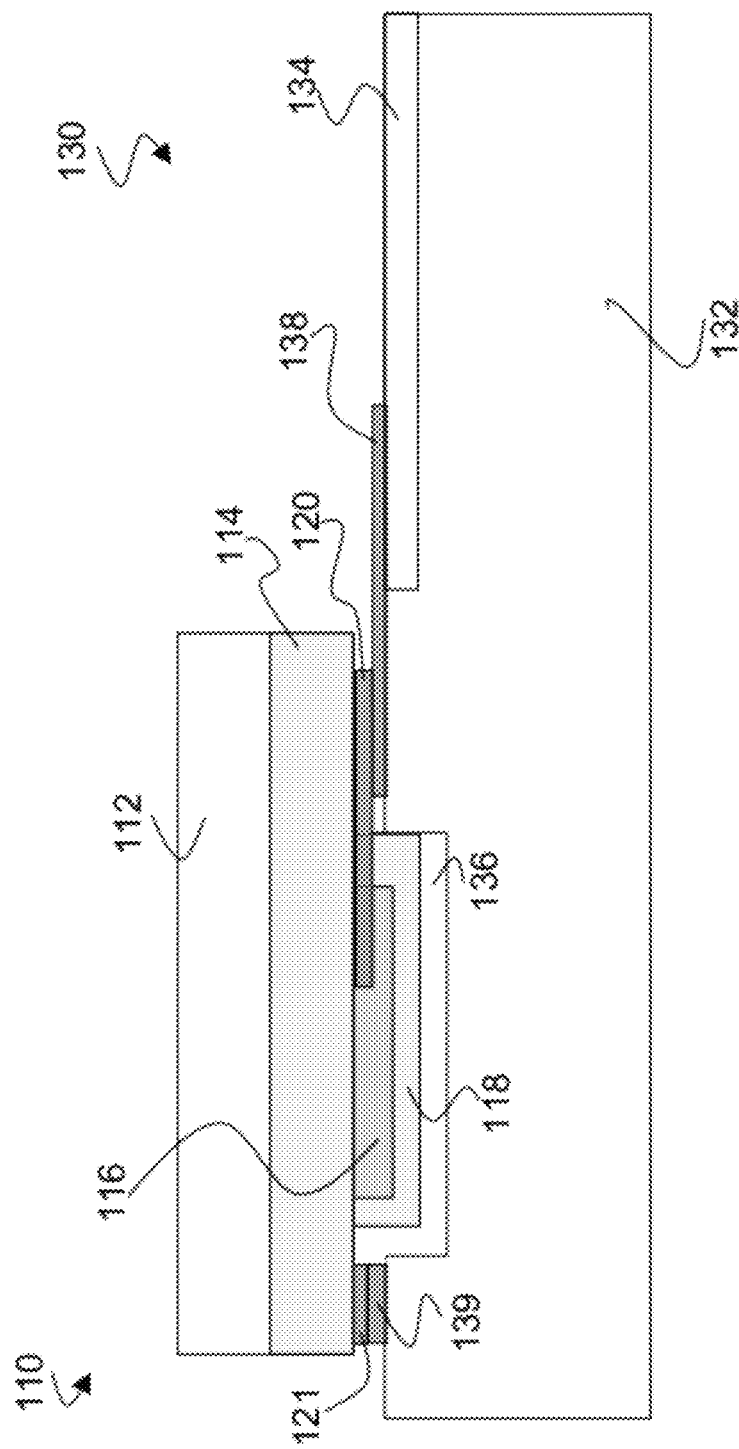
FIG. 29 is a schematic cross-section of the device of FIG. 27 with the high confinement waveguide optically coupling the optical and electro-optical devices.
Figure 30:
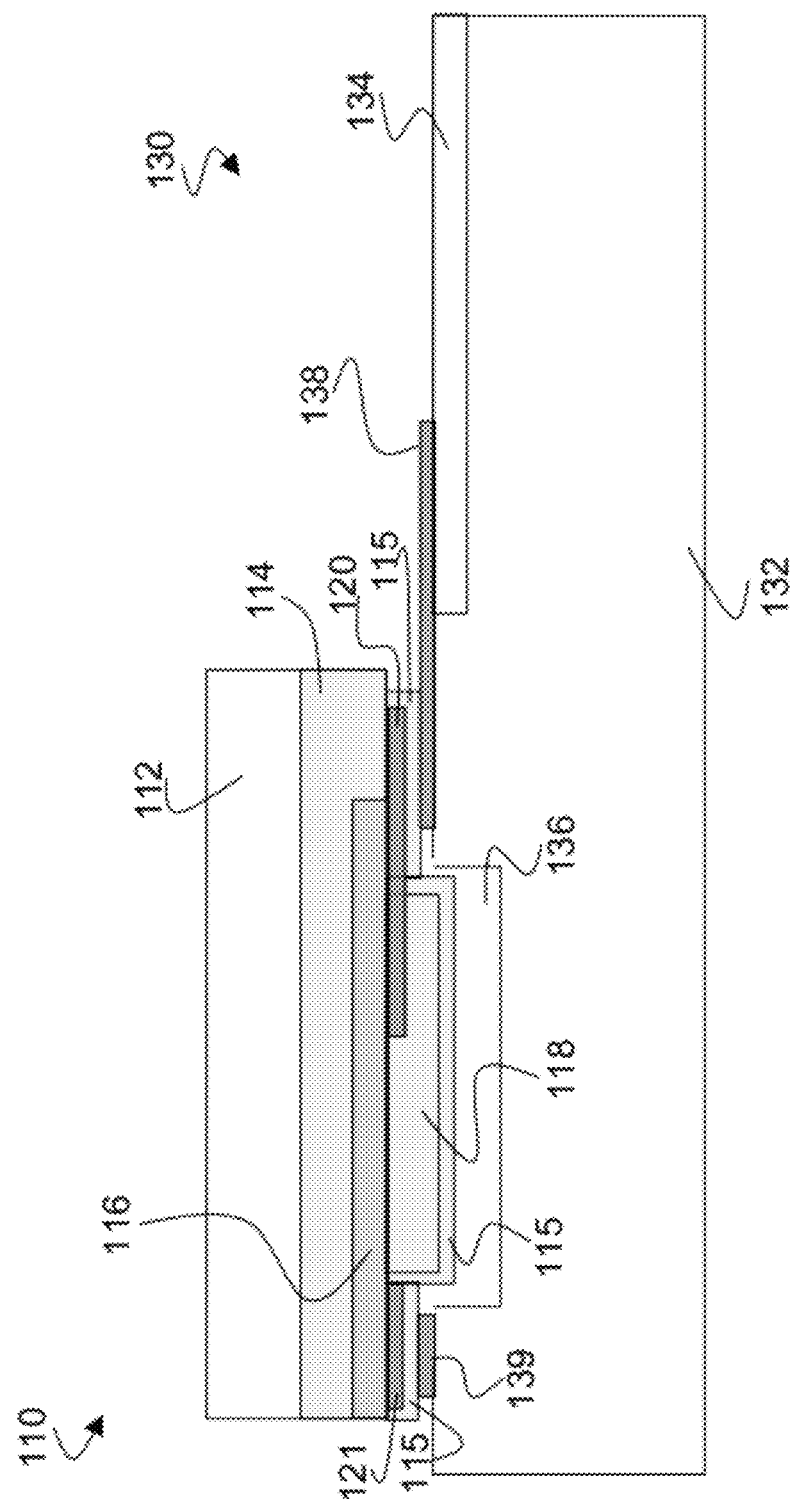
FIG. 30 is a schematic cross-section of the device of FIG. 28 optically coupled together.

The hybrid integration in accordance with the present invention takes advantage of the attraction of the optical signal to the large index contrast of the high confinement waveguide. Vertical coupling through vertically-stacked adiabatic tapers as shown in FIG. 10 couple a high confinement waveguide on a LN substrate to a high confinement waveguide on a PLC. The tolerance for horizontal alignment is significantly more relaxed than the butt coupling of the prior art. FIGS. 27 and 28 show side views of Silica-on-Silicon and LN devices apart while FIGS. 29 and 30, respectively, show the structures assembled together.

As seen in FIG. 27, a silica-on silicon PLC 110 comprises a silicon substrate 112, an $SiO_2$ lower cladding layer 114, a doped $SiO_2$ waveguide core 116 and an upper cladding layer 118. In addition, a high confinement SiN:Si waveguide 120 is optically coupled to the $SiO_2$ core 116 with an adiabatic taper. It is not essential that the high confinement waveguide 120 has an index of refraction $n_p$ that is equal to $n_c$ of high confinement waveguide 138. The confinement is relative to the substrate 112. Waveguide 120 is tapered at the opposite end to force adiabatic transfer to high confinement waveguide 138 on the electro-optic device 130. For assembly alignment, a spacer 121 of SiN:Si is deposited simultaneously with the high confinement waveguide 120. The electro-optic device 130 comprises a LN substrate 132 including a Ti-diffused waveguide 134 and an etched slot 136 for receiving the optical waveguide portion of the PLC 110. A high confinement waveguide 138 of SiN:Si is optically coupled with an adiabatic taper to transfer optical power vertically to the Ti-diffused waveguide 134. At its opposite end waveguide 138 also has a taper for adiabatic transfer to the taper of waveguide 120 (seen more clearly in FIG. 31). As in the PLC 110, a SiN spacer 139 is deposited simultaneously with the high confinement waveguide 138 to preserve alignment.

As shown in FIG. 28, the waveguide structure of the PLC 110 is slightly different from FIG. 27. FIG. 27 shows the SiN:Si strip waveguide 120 below the (Ge) doped $SiO_2$ waveguide core 116 before being inverted in this flip-chip orientation. In this case, the doped waveguide core 116 is deposited after the SiN:Si strip 120. Alternatively, the doped $SiO_2$ core layer 116 can be deposited before the SiN:Si 120 as shown in FIG. 28. The SiN:Si layer forms a waveguide 120 on top of the doped $SiO_2$ core 116 in the unflipped orientation. The SiN:Si waveguide 120, itself, can be used as an etch stop when removing the $SiO_2$ upper cladding 114 to expose the evanescent tail of the mode in either case. An additional thin $SiO_2$ layer 115 (shown in FIG. 28) can be deposited after exposing the SiN:Si 120 to control the mode coupling interaction. As shown in FIG. 28, high confinement waveguides 120 and 138 form a vertical directional coupler as shown in FIG. 12. Whereas the high confinement waveguides 120 and 138 as shown in FIG. 27 are optically coupled as adiabatic tapers as shown in FIG. 31.

Figure 31:
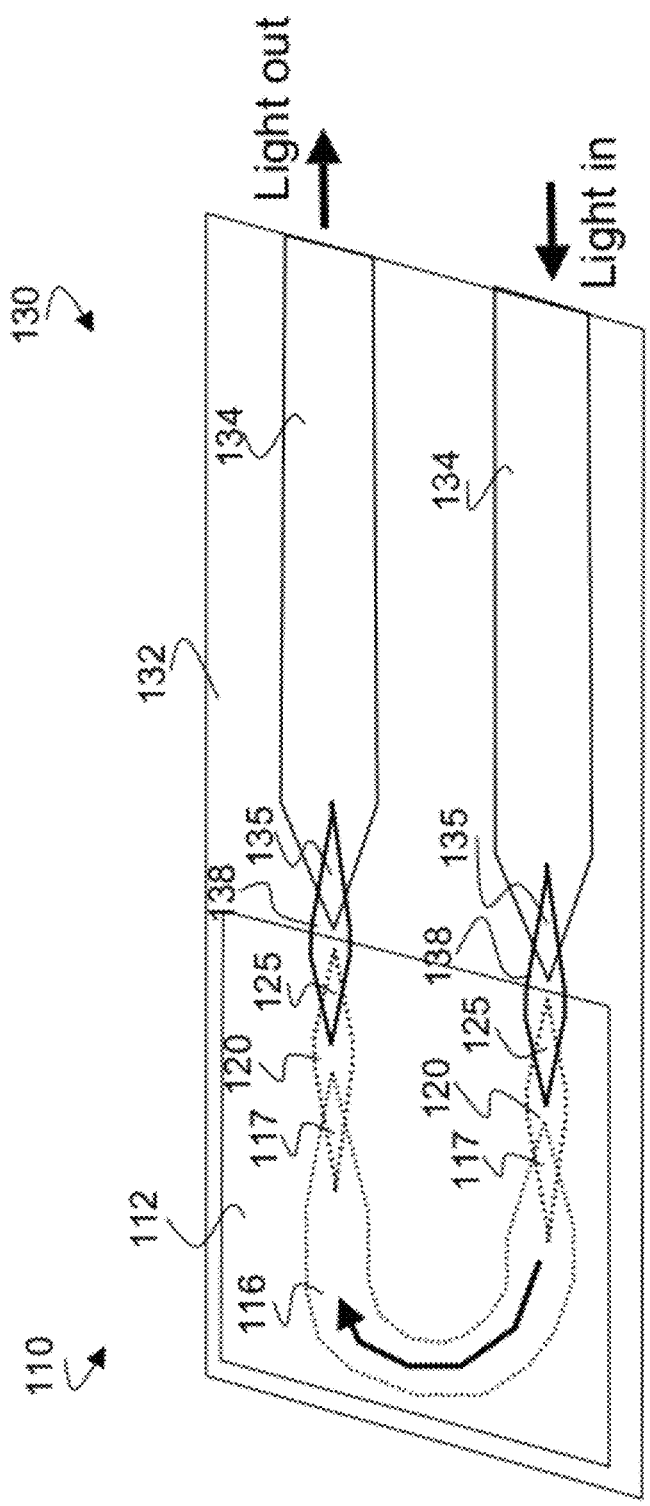
FIG. 31 is a top view of the two devices of FIG. 27 assembled together and schematically illustrating the optically coupled waveguides across the hybrid device.

FIG. 31 shows a top view of the two devices 110, 130 together schematically illustrating the optically coupled waveguides. Adiabatic tapers 135 couple light from a Ti-indiffused LN waveguide 134 into a SiN:Si-on-LN waveguide 138. Another set of adiabatic tapers 125 transfers the light into an SiN:Si waveguide 120 integrated on a flipped-chip Silica-on-Silicon device 110. Finally, another set of tapers 117 transfer the light into a doped $SiO_2$ (silica) core 116. The Silica-on-Silicon waveguide 116 steers the light through a 180° turn-a-round, after which the process is reversed to eventually return the light to a second Ti-indiffused LN waveguide 134. Note that the $SiO_2$ cladding 118 and air isolate the doped $SiO_2$ (silica) core 116 from the LN substrate 132.

There are a wide variety of hybrid devices and designs possible with integrated Silica-on-Silicon and LN waveguide technologies. The selection of which device is flipped can be reversed, i.e., the LN device can be flipped-chip mounted onto a Silica-on-Silicon device. Other device functions are possible, as well. For example, after modulation in an LN device, polarization rotation, beam combining, and coupling into an output fiber can be accomplished in a Silica-on-Silicon device. In fact, all passive functions can be accomplished in a Silica-on-Silicon device, while all high-speed modulation functions can be performed in the LN device.

The hybrid technology can even assist in manufacture of LN devices. A passive optical probe head consisting a Silica-on-Silicon device attached to an optical fiber can couple light in or out of a Ti-indiffused LN waveguide via the SiN:Si waveguides, allowing for wafer-level optical testing without the need for dicing and polishing the endfaces of the LN device. The SiN:Si waveguides (one in the optical head, one on the LN) are temporarily brought in optical contact with each other while testing a particular device on the LN wafer. The optical probe can be moved from device-to-device on the chip. The adiabatic tapers allow for much increased lateral alignment tolerance, making alignment simpler than the traditional butt coupling of fibers to the endface of an LN waveguide.

Another compliant material, with optical index similar to that of SiN:Si, can be used as "optical glue" between SiN:Si waveguides. This can be used for improving coupling between the Silica-on-Silicon device and LN device, for the case where either or both of the substrates are not flat enough to allow for intimate contact between all of the SiN:Si waveguides across the entire surface of the device. An example of a suitable optical glue consists of particles of high index material, e.g., $TiO_2$ or a high-index semiconductor, such as silicon or InP, suspended in an epoxy resin.

Note that other LN waveguide technologies are compatible with SiN:Si-on-LN waveguides, for example, Annealed Proton Exchanged (APE) waveguides in place of diffused waveguides. Other materials can be used in place of SiN:Si, assuming their optical index and optical propagation loss satisfy the requirements discussed earlier. Other passive waveguides can be used in place of Silica-on-Silicon waveguides, for example ion-exchanged glass waveguides.

We claim:
1. An electro-optic device comprising:
an electro-optic substrate having a refractive index $n_s$;
a first diffused waveguide within the electro-optic substrate
for transmitting an optical signal through the device for electrically-induced modulation, the first diffused waveguide having a refractive index $n_{w1}$ greater than $n_s$;

first and second separate high confinement waveguides having refractive indices $n_{c1}$ and $n_{c2}$, respectively, wherein $n_{c1}$ and $n_{c2}$ are greater than $n_{w1}$, wherein the first and second high confinement waveguides are optically coupled to each other, forming a directional coupler comprising a taper for adiabatic transfer of the optical signal, wherein the first high confinement waveguide is optically coupled to the first diffused waveguide, wherein the first high confinement waveguide and the first diffused waveguide form a first hybrid waveguide, wherein the first high confinement waveguide is at least partially disposed within the first diffused waveguide in the electro-optic substrate, the electro-optic device further comprising a second diffused waveguide having a refractive index $n_{w2}$ greater than $n_s$, wherein the second high confinement waveguide and the second diffused waveguide form a second hybrid waveguide, wherein the second high confinement waveguide is at least partially disposed within the second diffused waveguide in the electro-optic substrate, and the first and second high confinement waveguides are disposed in a horizontally separated side-by-side configuration, and wherein the first and second diffused optical waveguides of the first and second hybrid waveguides overlap in a coupling region.

2. An electro-optic device as defined in claim 1, wherein the device comprises a Mach-Zehnder interferometer having an output optical waveguide comprising the first diffused waveguide, and an optical tap output waveguide comprising the second high confinement waveguide, whereby in operation, the directional coupler facilitates tapping of the optical signal from the output optical waveguide of the Mach-Zehnder interferometer into the optical tap output waveguide.

3. An optical device as defined in claim 1, wherein the device comprises a ring resonator including a straight waveguide comprising the first hybrid waveguide and a ring waveguide disposed for evanescent coupling with the straight waveguide and comprising the second hybrid waveguide.

4. An electro-optic device as defined in claim 1, wherein the first diffused waveguide forms a Mach-Zehnder interferometer comprising first and second arms, wherein the second high-confinement waveguide has separated first and second ring sections forming first and second ring resonators, respectively, optically coupled to the first and second arms, respectively, and disposed such that the first ring resonator coupled to the first arm and the second ring resonator coupled to the second arm have equal bias voltages and opposite signs thereof.

5. An electro-optic device as defined in claim 1, wherein the device comprises a grating formed as a periodic structure along the length of the first high confinement waveguide.

* * * * *